United States Patent [19]

Thompson

[11] 4,153,072
[45] May 8, 1979

[54] PILOT VALVE

[75] Inventor: David B. Thompson, Lewisville, Tex.

[73] Assignee: Otis Engineering Corporation, Dallas, Tex.

[21] Appl. No.: 840,010

[22] Filed: Oct. 6, 1977

[51] Int. Cl.² .............................................. F16K 17/00
[52] U.S. Cl. .................................. 137/467; 137/456;
137/596.1; 137/596.17; 137/596.18; 251/69
[58] Field of Search ............ 137/456, 458, 467, 596.1,
137/596.17, 596.18; 251/69

[56] References Cited

U.S. PATENT DOCUMENTS

| | | | |
|---|---|---|---|
| 3,358,207 | 12/1967 | Natho | 251/69 X |
| 4,087,073 | 5/1978 | Runberg | 137/458 X |

Primary Examiner—Gerald A. Michalsky
Attorney, Agent, or Firm—H. Mathews Garland

[57] ABSTRACT

A monitor-actuator pilot valve operable to close a safety valve in a fluid flow system reponsive to low line pressure or electrical failure. The safety valve is held open by pressure supplied into an actuator cylinder from the line protected by the safety valve. The pilot valve includes a first flow passage communicating with line pressure, a second flow passage communicating with the safety valve actuator cylinder, a third exhaust flow passage to the atmosphere, and a fourth flow passage to a fluid pressure reset. A valve assembly in the pilot valve responds to a low pressure in the first passage or electrical failure to connect the second and third passages for exhausting control pressure from the safety valve actuator cylinder to close the safety valve. An electromagnet on the pilot valve releases the valve assembly in response to a power failure allowing the safety valve to close. A reset assembly in the valve body manually or hydraulically operates the valve assembly reopening the pilot valve. The low pressure response mechanism is reset hydraulically or manually. The electrical response mechanism is reset only manually.

25 Claims, 23 Drawing Figures

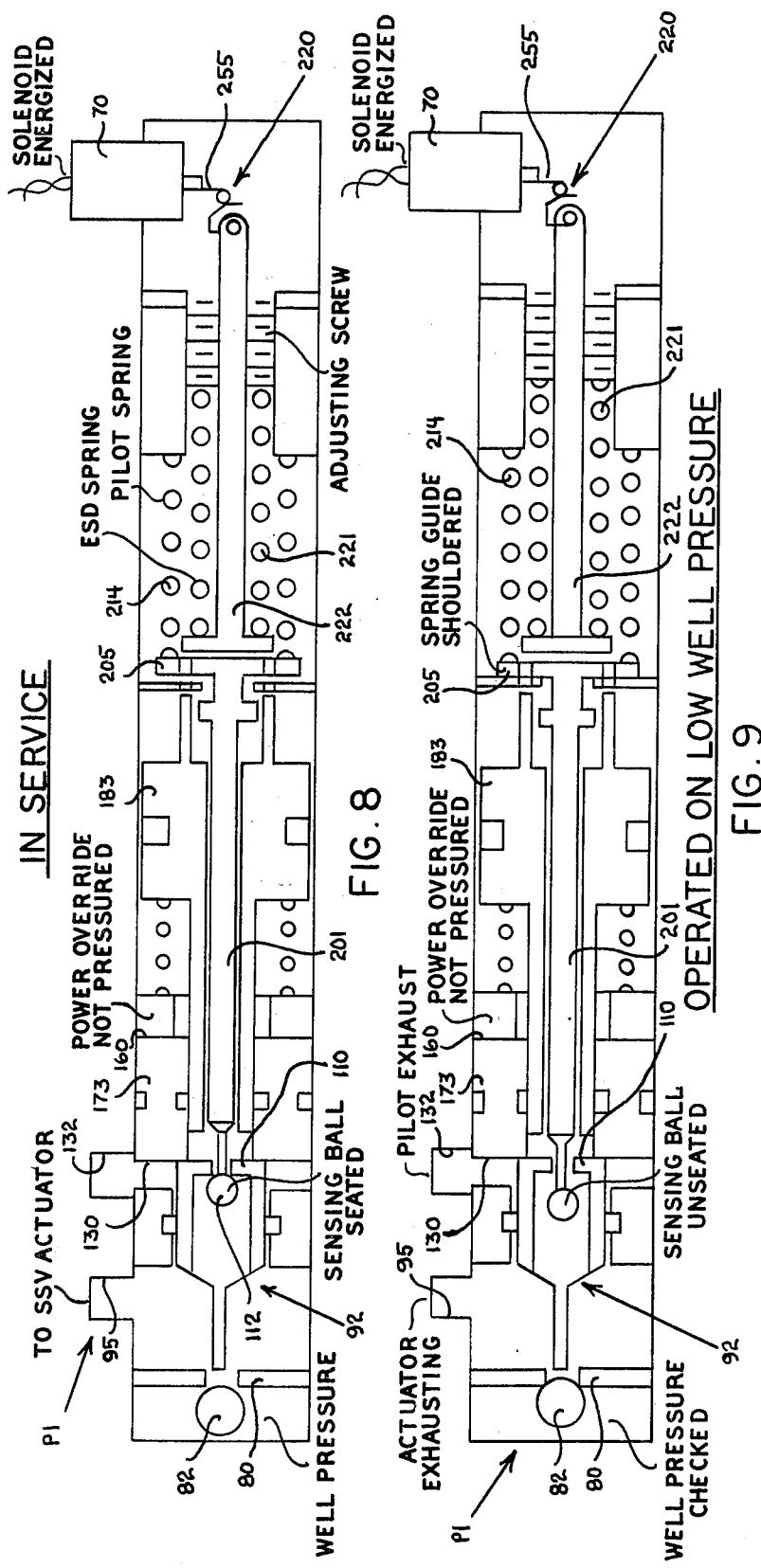

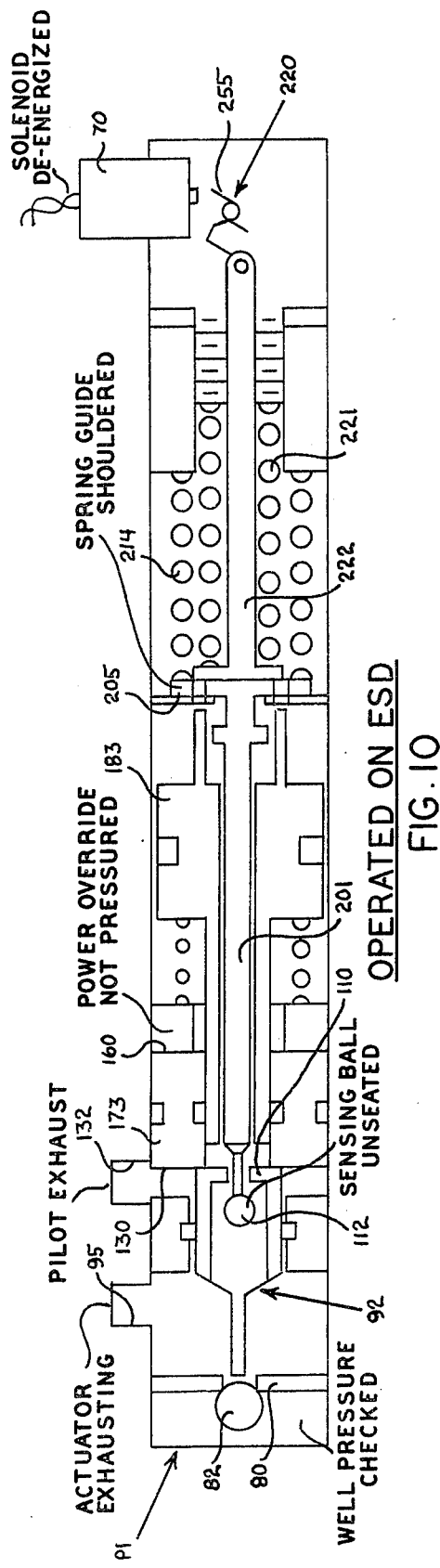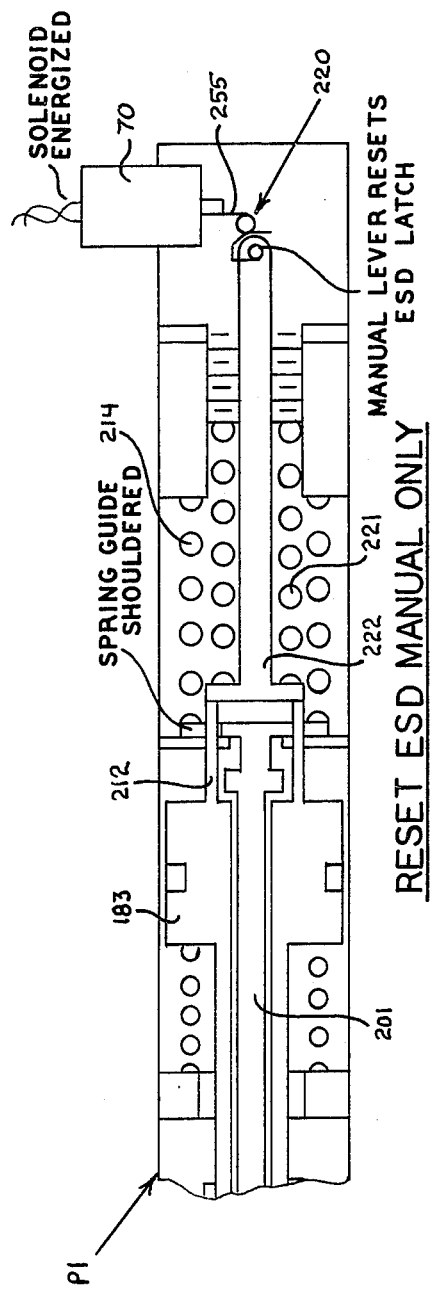

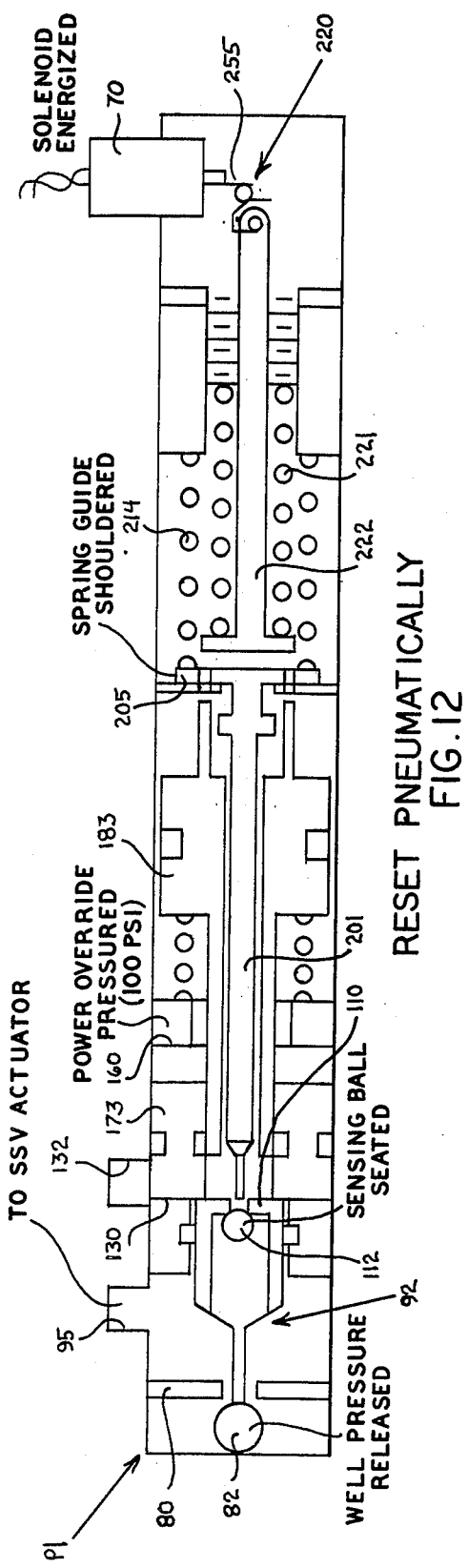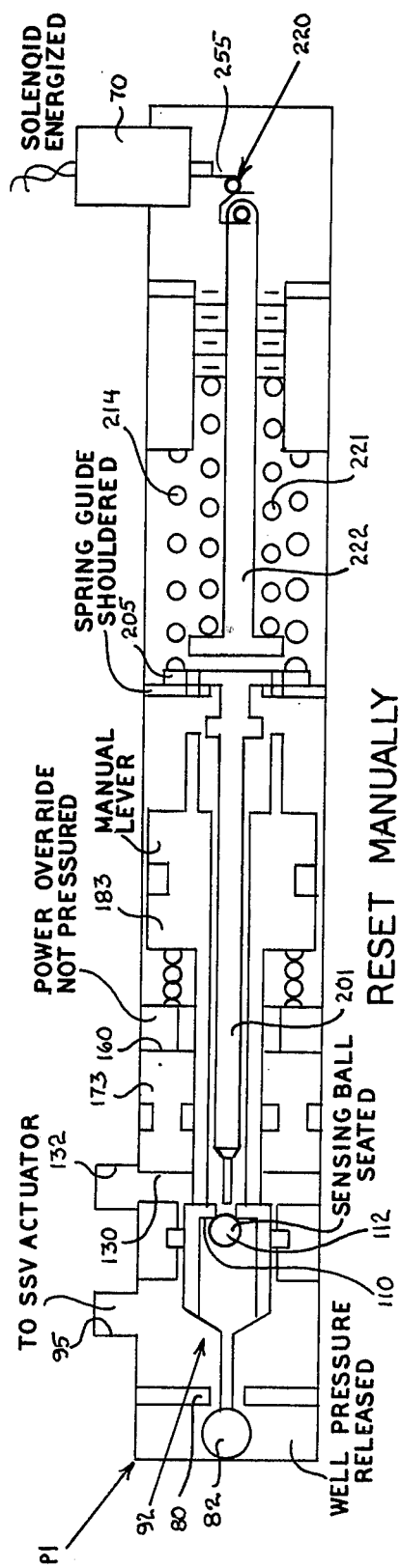

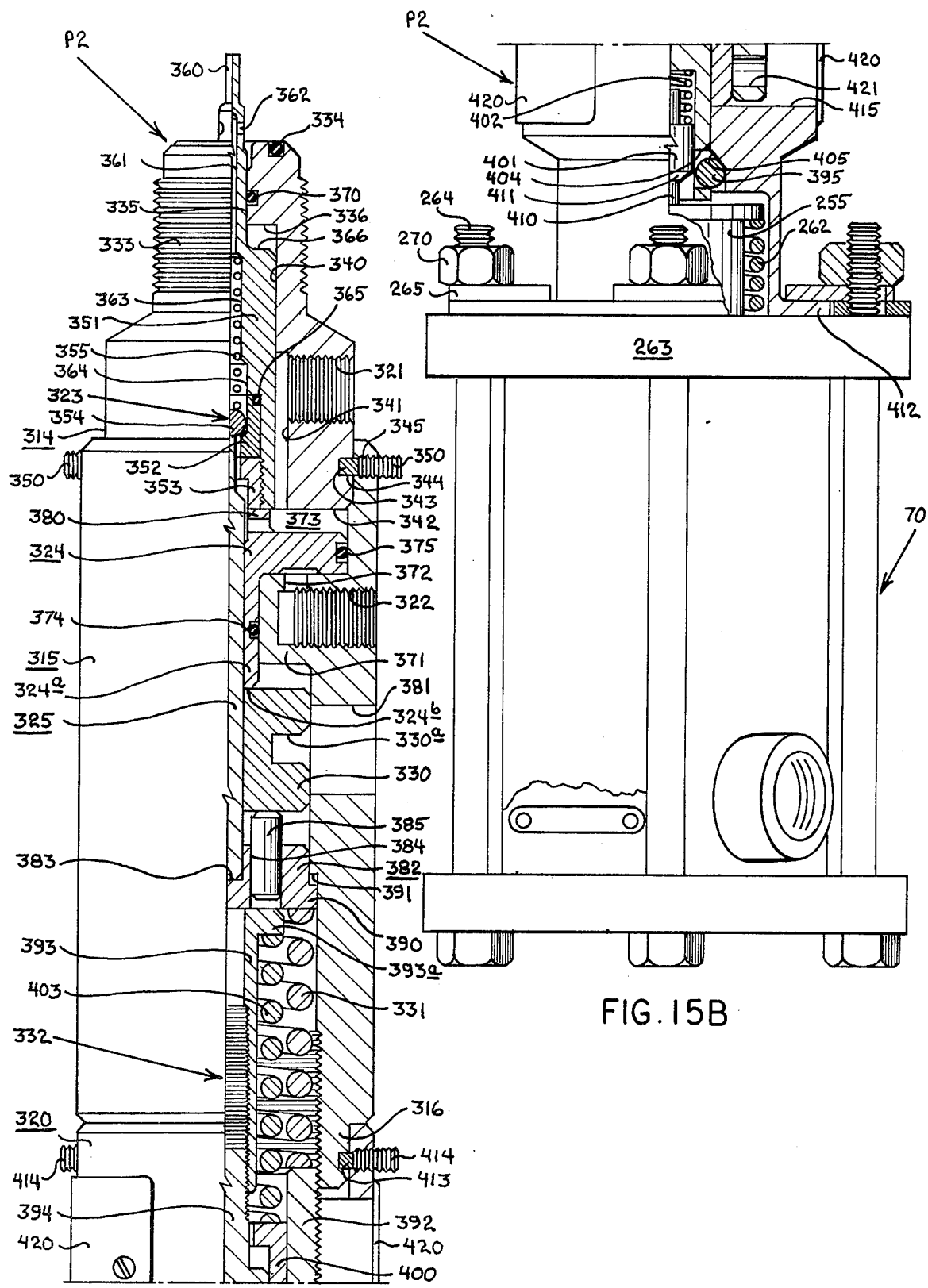

PILOT VALVE

This invention relates to valves and more particularly relates to pilot valves used in controlling safety valves in fluid flow systems.

In the operation of fluid flow systems such particularly as are used for controlling the flow of oil and gas both at wellheads and along flow lines at other locations in such systems it is established practice to use safety valves which function in response to a number of different changes in operating conditions. In order to minimize personnel injury and death, environmental damage, and equipment damage, oil and gas systems include such safety valves which are designed to automatically close in the event of pressure fluctuations either above or below predetermined settings due to fire, high and low liquid levels, high and low temperatures, rate of pressure decrease, and other abnormal conditions. For example storm damage and damage from floating vessels is not uncommon on offshore platforms. In both land based and offshore platform installations as well as offshore under water installations catastrophes occur in which flow lines are broken creating sudden decreases in pressure at safety valves in the systems. Similarly the dependence on electrical power is frequently of sufficient importance to shut down the flow system until the power is restored. Safety valves which are commonly used in oil and gas flow systems include valve members for controlling flow which are connected with a hydraulic piston adapted to respond to fluid pressure for opening and closing the valve. In some forms of such valves the hydraulic piston as well as the valve member operate in response to the pressure of the fluid being controlled so that a sudden pressure drop at the safety valve may result in closing the valve. Such valves use a pilot valve which responds to the pressure change in the safety valve body to immediately release the safety valve control pressure so that the safety valve will close. In other forms of hydraulically operated safety valves an independent source of control pressure is often employed which is operable in response to sensing a condition such as pressure changes at a remote location. The present invention is concerned with the directly controlled safety valve which is closed and reopened by the pilot valve connected on the safety valve either exhausting or readmitting pressure from the line being controlled by the safety valve. While pilot valves are available for such safety valve control designed to respond to various operating conditions there are however, no pilot valves known to be available which combine a number of desired features including low pressure response, emergency shutdown due to electrical failure, local or remote hydraulic reset, manual reset of the low pressure response function of the system, and local manual reset of the electrical failure portion of the system.

It is a principal object of the invention to provide a new and improved pilot valve for operation of a fluid flow safety valve.

It is another object of the invention to provide a monitor-actuator type pilot valve in a direct controlled fluid flow safety system.

It is another object of the invention to provide a pilot valve of the character described which responds to a predetermined low pressure.

It is another object of the invention to provide a pilot valve of the character described which responds to an electrical system failure.

It is another object of the invention to provide a pilot valve of the character described which is reset either remotely or directly by hydraulic pressure.

It is another object of the invention to provide a pilot valve of the character described which is directly reset manually.

It is another object of the invention to provide a pilot valve of the character described which has a manually reset electrical latching system.

It is another object of the invention to provide a pilot valve of the character described which combines the functions of low pressure response, electrical failure response, local or remote hydraulic reset, and manual reset, of both the low pressure and electrical failure response systems of the valve.

In accordance with the invention there is provided a monitor-actuator pilot valve for controlling the operation of a fluid flow safety valve which includes a valve body having a central bore, a first flow passage for communicating the bore with the fluid pressure controlled by the safety valve, a second flow passage for communicating the bore with the control cylinder of a safety valve, a third fluid flow passage communicating with the bore for exhaust to the atmosphere, and a fourth fluid flow passage communicating with the bore for hydraulic reset of the pilot valve. The valve assembly is positioned in the valve body bore for controlling flow between the second flow passage leading to the safety valve control cylinder and the third flow passage to exhaust the control fluid for shutting the safety valve in response to a low pressure sensed through the first flow passage. An electromagnet is connected with the valve assembly through a mechanical linkage in the body bore for opening the valve assembly to shut the safety valve in response to an electrical failure. Valve reset structure in the body bore includes a hydraulic piston operable in response to a fluid pressure in the fourth passage into the bore and includes a reset sleeve manually operable to operate the valve assembly and relatch the electromagnet coupling device manually. One form of the pilot valve includes a velocity check valve in the first flow passage. Another form of the pilot valve is connectable into a safety valve provided with a velocity check valve to control flow from the safety valve body into the pilot valve first flow passage.

Preferred embodiments of a pilot valve constructed in accordance with the invention together with the objects and advantages of the invention will be better understood from the following detailed description thereof taken in conjunction with the accompanying drawings wherein:

FIG. 1 is a side view in elevation and section of a pilot valve embodying the features of the invention mounted on a pilot-controlled actuator-gate type surface safety valve for a fluid flow system;

FIGS. 2A thru 2C taken together are a longitudinal view in section and elevation of a pilot valve embodying the features of the invention as shown in FIG. 1;

FIG. 8 is a schematic view in section of the pilot valve of FIGS. 2A–2C in operating condition functioning to hold the safety valve open as shown in FIG. 1;

FIG. 9 is a schematic view in section similar to FIG. 8 showing the pilot valve operated in response to a low fluid pressure;

FIG. 10 is a schematic view similar to FIG. 8 showing the pilot valve operated on electrical emergency shutdown in response to an electrical system failure;

FIG. 11 is a fragmentary schematic view showing manual reset of the electrical emergency shutdown system;

FIG. 12 is a schematic view similar to FIG. 8 showing pneumatic reset of the pilot valve;

FIG. 13 is a schematic view in section similar to FIG. 8 showing manual reset of the pilot valve;

FIGS. 15A and 15B taken together are a longitudinal view in section and elevation of the pilot valve illustrated in FIG. 14.

Figure 1:
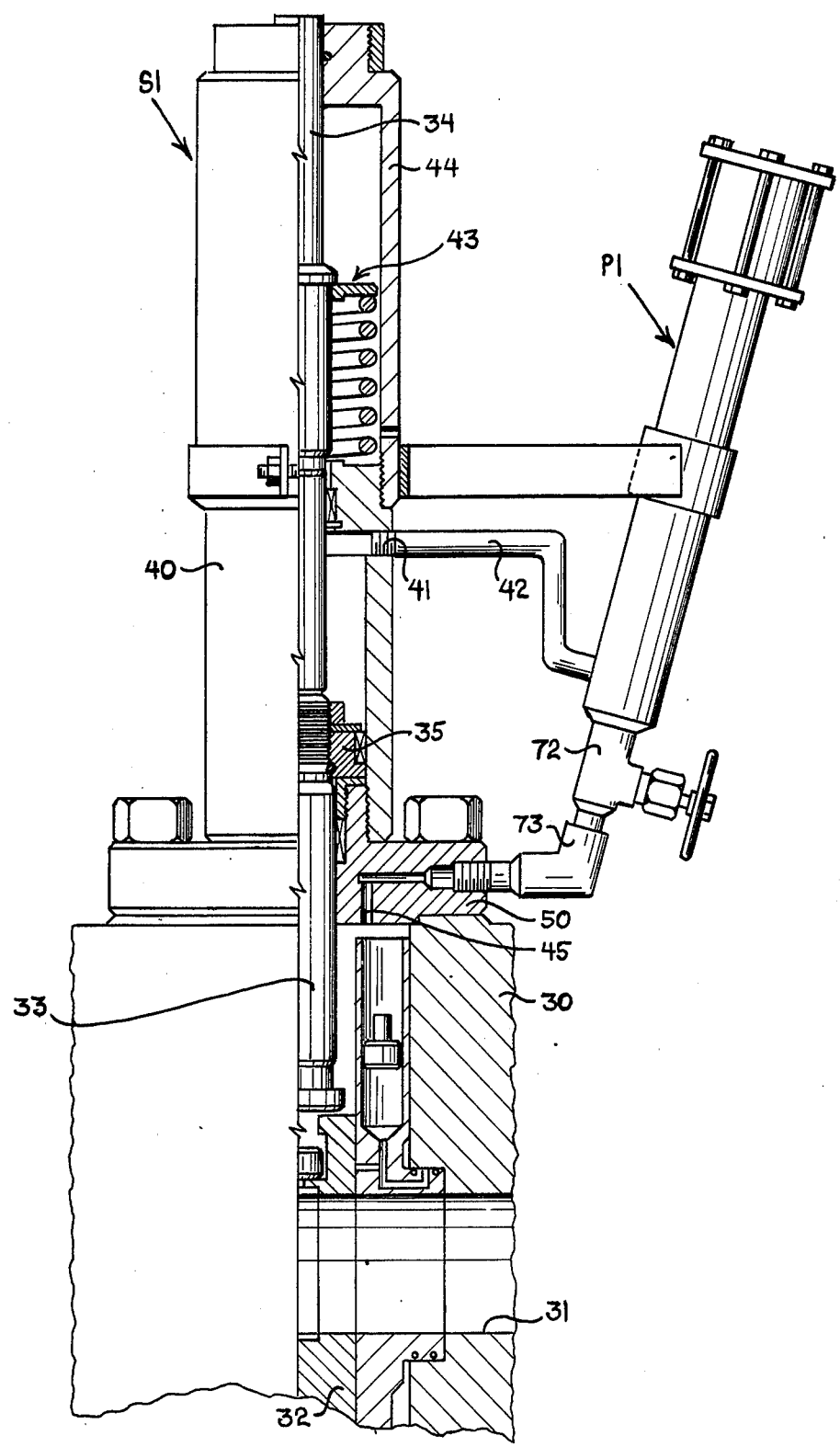

Referring to FIG. 1, a pilot valve P1 embodying the features of the invention is connected on a safety valve S1 installed in a flow line, not shown, to provide automatic safety valve shut off protection for the flow line. The safety valve is Type U Otis Hydraulic Actuator/Gate Valve Combination as illustrated at page 24 of the Otis Engineering Corporation catalog entitled *Surface Safety Equipment and Systems,* dated September 1975. The valve as illustrated in such catalog is modified to provide valve body pressure operation and to accomodate the pilot valve P1. The safety valve includes a valve body 30 having a flow passage 31 which communicates with the line in which the valve is connected. A gate valve member 32 is vertically movable in the valve body between a lower open position as illustrated and an upper closed position. The valve member 32 is supported on a lower stem 33 which is connected with an upper stem 34. A piston 35 is mounted on the lower stem in a cylinder 40 which has a side port 41 communicating through a line 42 to the pilot valve P1. A spring assembly 43 is mounted on the upper stem 34 within the housing 44 supported on the cylinder 40. Flow line pressure within the valve body is communicated into the pilot P1 through a flow passage system 45 in the valve flange 50. Flow line pressure within the valve body is communicated into the control cylinder 40 through the passage system 45, the pilot valve P1, the line 42, and the side port 41 in the piston. So long as normal full flow line pressure is communicated from the valve body through the pilot valve into the control cylinder above the piston 35 the pressure on the top face of the piston is sufficient to hold the safety valve open with the spring 43 compressed. If the pressure within the safety valve body drops below a predetermined level the pilot valve P1 is operated shutting off flow of fluid from the safety valve body into the pilot valve and communicating the control cylinder 40 with the exhaust of the pilot valve so that the fluid pressure above the piston 35 is reduced to atmospheric permitting the spring 43 to expand lifting the safety valve stems raising the gate valve member 32 to shut the safety valve S1. When the pilot valve P1 is reset the flow line pressure within the safety valve body is readmitted through the pilot valve to the control cylinder 40 through the line 42 from the pilot valve and the side port 41 in the control cylinder. The line pressure in the control cylinder forces the piston 35 back downwardly opening the gate valve member 32 and compressing the spring 43. The pilot valve P1 may also accomplish the same safety valve shutting function in response to a failure in the electrical system connected with the pilot valve. The pilot valve may be reset hydraulically either locally at the valve or remotely. The electrical emergency shutdown system of the pilot valve must be manually reset at the pilot valve.

Figures 2A, 2B, 3:
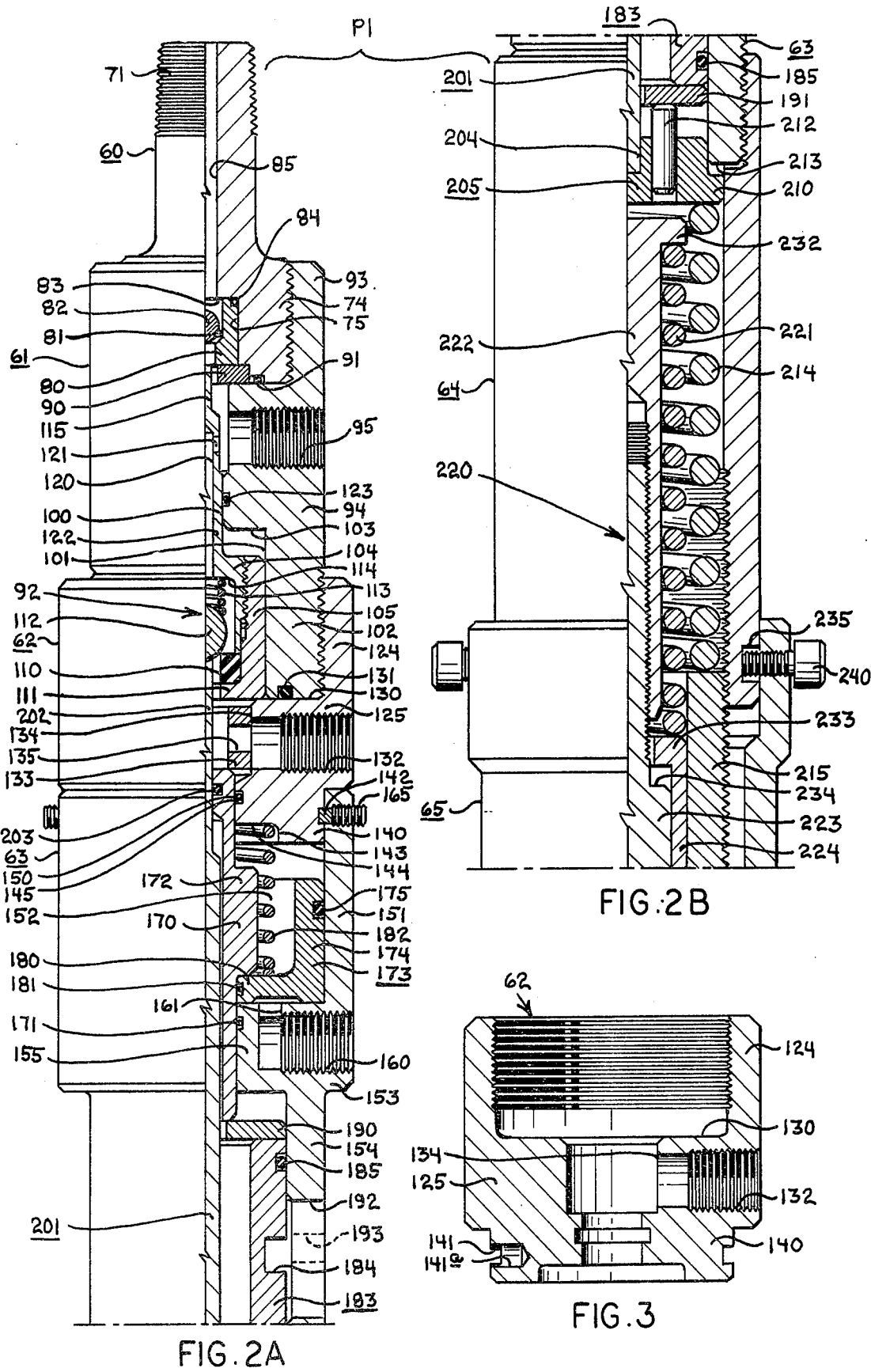
FIG. 3 is a side view in section of the exhaust body of the pilot valve of FIGS. 2A-2C.
Figure 2C:
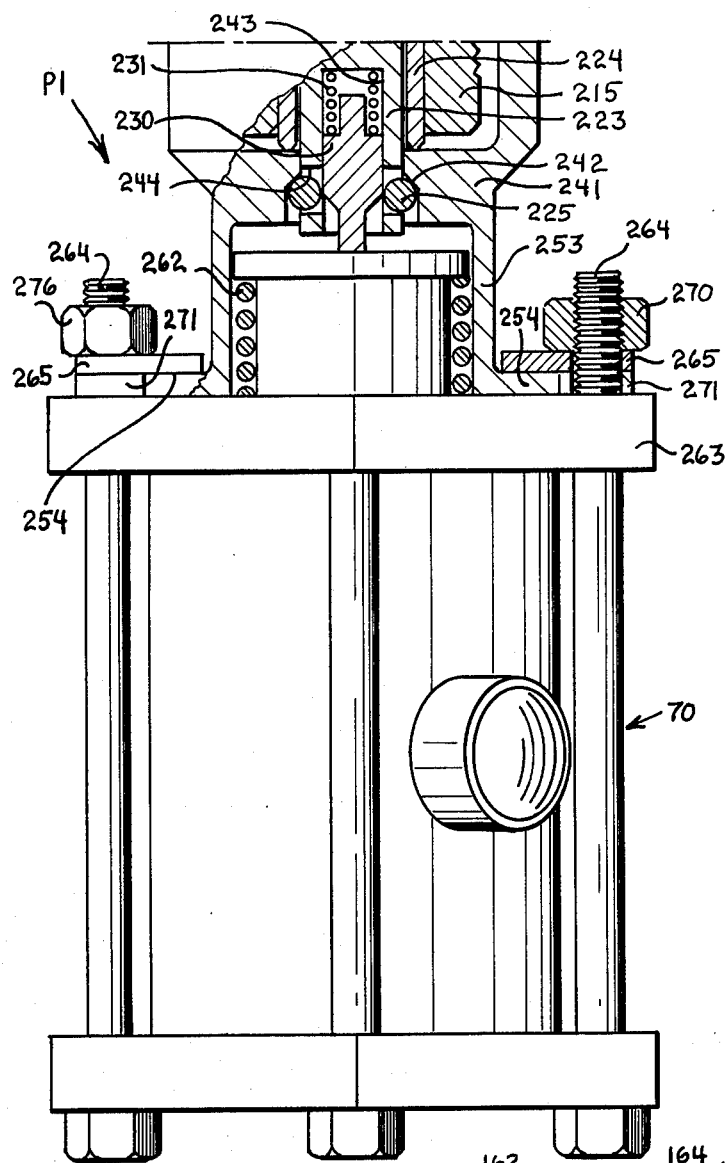
FIG. 2D is a side view in elevation of a manual reset handle used to return the pilot valve of FIGS. 2A-2C to operation.

Referring to FIGS. 2A thru 2C, the pilot valve P1 has a tubular body defined by the following interconnected elements: a lower velocity check valve body 60; a pilot valve body 61; an exhaust body 62; an override housing 63; a spring housing 64; and an electrical emergency shut down housing 65. An electromagnet 70 is secured to the body at the housing 65. The body 60 has a reduced threaded lower end portion 71 which is sized to engage the body of a valve 72 as shown in FIG. 1 which connects with an L-shaped fitting 73 for mounting the pilot valve on the flange 50 of the safety valve S1. The body 60 has an enlarged externally threaded opposite end portion 74 having an enlarged bore portion 75 in which a valve seat 80 is fitted. The valve seat 80 has a graduated bore having portions of two diameters which join defining an internal annular valve seat 81 which is engageable by a velocity ball check valve 82. The outer enlarged bore portion end of the valve seat 80 is engageable with an internal annular seat 83 in the body 60 which also traps the ball check valve 81 within the enlarged bore portion of the valve seat. A ring seal 84 around the valve seat 80 seals between the seat and the enlarged bore portion 75 of the body 60. The body 60 has a central bore 85 which opens through the shoulder 83 into the bore of the valve seat 80 defining the first flow passage into the pilot valve body for communicating the pilot valve with the pressure in the body of the safety valve S1. When the pilot valve P1 is connected with the safety valve the bore 85 communicates through the valve 72 and the fitting 73 into the passage system 45 of the safety valve flange 50 as shown in FIG. 1. A backup ring 90 fitted in the inward end portion of the graduated bore of the body 60 holds the velocity check valve seat 80 in position. A ring seal 91 seals around the backup ring 90 between the body 60 and the pilot body 61. The velocity check valve permits the pilot valve to sense a pressure drop in the safety valve body sufficiently to activate the pilot valve to close the safety valve while the check valve thereafter isolates the pilot valve from the pressure in the safety valve until the pilot valve is reset so that once the pilot valve is operated to close the safety valve there is no bleed down of the pressure, if any, in the safety valve body through the pilot valve.

The charging of the safety valve control cylinder 40 with line pressure within the body of the safety valve and the exhaust of that pressure from the control cylinder to close the safety valve is controlled by a pilot valve assembly 92 mounted in the pilot valve body supported primarily in the pilot body 61. The pilot body 61 has an internally threaded end portion 93 engaged on the externally threaded end portion 74 of the lower body 60. The body 61 has a longitudinal bore throughout its length which is reduced substantially in diameter in a central portion of the body 94 which is provided with an internally threaded side port 95 and an internal cylindrical seal surface portion 100. The port 95 is threaded for connection of the line 42 to the control cylinder 40. The bore of the body 61 is substantially enlarged along a bore portion 101 in an externally threaded end portion 102 of the body. An internal annular shoulder surface 103 is defined at the inward end of the bore portion 101 in the body 61. The ball and seat assembly 92 includes a graduated tubular plunger 104, a cap 105 threaded on an enlarged externally threaded end portion of the plunger, an annular seal 110 supported within the cap against an internal annular flange 111 of the cap, a ball valve 112 within the enlarged end portion of the plunger and the cap operable with the seal 110, and a spring 113 confined between the ball valve and an internal shoulder 114 of the cap to bias the ball valve toward the seal. The plunger 104 has a reduced reset tip portion 115 which is insertable through the backup ring 90 and the seat 80 to engage the velocity check valve ball 82 for holding the ball off seat during reset of the pilot valve as discussed in detail hereinafter. The plunger 104 has a central bore 120 which communicates with side ports 121 in the plunger and with the enlarged bore portion of the plunger in which the ball valve 112 is disposed. A central portion 122 of the plunger slides along the seal surface 100 of the pilot body. A ring seal 123 is supported in an internal annular recess of the pilot body around the plunger central portion 122 forming a seal between the plunger and the pilot body bore seal surface. The entire ball valve assembly 92 is movable within the pilot body between an operating end position as shown in FIG. 2A and a reset position at which the enlarged threaded end portion of the plunger 104 and the cap 105 engage the pilot body shoulder surface 103. The ball assembly 92 also serves a safety valve closing function during which the ball valve 112 moves off seat to exhaust pressure from the safety valve control cylinder 40 for closing the safety valve.

Referring to both FIGS. 2A and 3 the exhaust body 62 has one internally threaded end portion 124 which is threaded on the end portion 102 of the pilot body 61. The bore of the exhaust body 62 is substantially reduced along a central portion 125 providing an internal annular shoulder 130 which engages the end edge of the portion 102 of the pilot body 61 limiting the extent to which the pilot body and the exhaust body may be threaded together. The shoulder 130 extends inwardly of the end edge of the body portion 102 overlapping the bore through the portion 102 sufficiently to provide a stop for the end edge of the pilot valve assembly 92. The cap flange 111 of the pilot valve assembly engages the shoulder 130 at the operating end position of the valve assembly as shown in FIG. 2A. A ring seal 131 in an annular recess in the end edge of the pilot body portion 102 seals between the pilot body and the exhaust body shoulder 130. The pilot body has a side exhaust port 132 leading to the atmosphere for release of the pressure in the control cylinder 40 of the safety valve S1. A spacer ring 133 is slidably disposed in a central bore portion 134 of the exhaust body. The spacer ring has diametrally opposed side ports 135 for flow from the bore of the spacer into the exhaust port 132. The exhaust body 62 has a reduced end portion 140 which telescopes into the override housing 63 and is provided with an external annular groove 141 for a retainer wire 142 which locks the exhaust body and the override housing together. The retainer wire connected with the override housing is explained in more detail in connection with the description of the override housing 63. The exhaust body 62 has an annular internal recess 143 in the end of the body at the housing 63 defining a spring stop shoulder 144. The end portion 140 of the exhaust body 62 has a reduced bore portion 145 around which an internal annular recess is formed in the exhaust body in which a ring seal 150 is positioned.

Figures 4A, 4B, 4C:
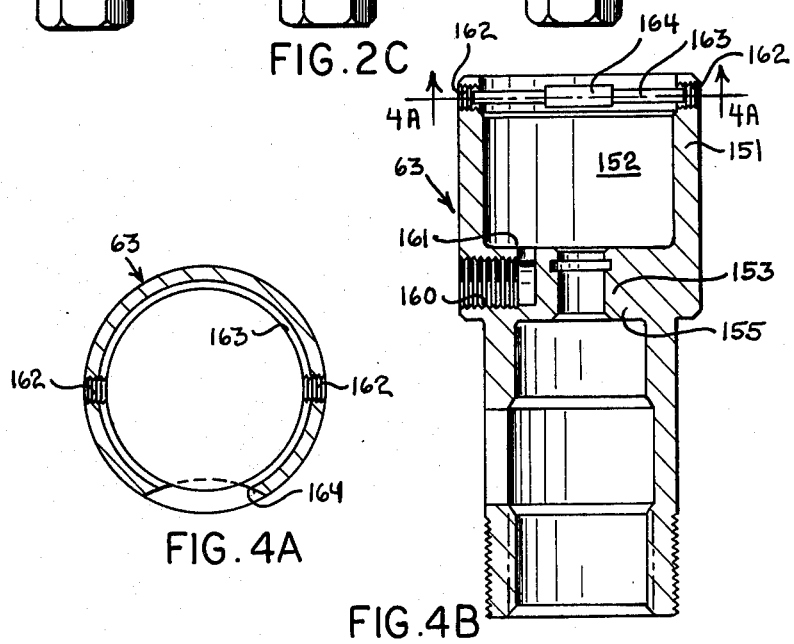
FIG. 4A is a view in cross-section of the override housing of the pilot valve of FIGS. 2A-2C taken along the line 4A—4A of FIG. 4B.
FIG. 4B is a longitudinal view in section along a center line of the override housing of the pilot valve of FIGS. 2A–2C.
FIG. 4C is a fragmentary view in elevation of the override housing showing the reset handle operating slots.

The override housing 63 is a graduated tubular member having a first large portion 151 provided with a bore defining a pressure reset chamber 152, a central portion 153, and a reduced portion 154. The central portion 153 is a reduced internal diameter section defining an internal flange portion 155 which has an internally threaded side port 160 which communicates with a port 161 provided in the flange portion leading into the reset chamber 152. Further details of the override housing 63 are illustrated in FIGS. 4A, 4B, and 4C. FIGS. 4A and 4B particularly show the structure of the housing which provides for connection with the retainer wire 142 with the exhaust body 62. The housing 63 has diametrically opposed set screw holes 162 which open into an internal annular recess 163 for the retainer wire. An outwardly opening arcuate recess 164 is cut through the outer surface of the housing 63 aligned with and into intersecting relationship with the internal annular recess 163. In assemblying the pilot valve housing the override housing 63 is telescoped over the reduced end portion 140 of the exhaust body 62. The externally annular recess 141 in the body 62 is aligned with the internal annular recess 163 in the housing 63 with the retainer wire 142 disposed circumferentially within the two recesses thereby interlocking the body 62 and the housing 63 longitudinally. The retainer wire is installed in the aligned annular recesses by inserting the wire through the recess 164 in the housing 63. The retainer wire is a standard type member having one bent L-shaped end portion which hooks into the radial blind hole 141a in the body 62 opening into the recess 141 as shown in FIG. 3. The retainer wire is readily installed by first positioning the body and the housing together in the telescoping relationship shown in FIG. 2A, aligning the recess 141a in the body 62 with the recess 164 in the body 63 and then rotating the inner body 62 as the retainer wire is fed into the aligned recesses 141 and 163. After the retainer wire is fully inserted between the body and the housing set screws 165 are inserted in the set screw holes 162 in the housing 63 and tightened until the inward end of each of the set screws engages the retainer wire 142.

Referring to FIG. 2A, an override operator member 170 is slidably positioned within the override housing 63 for applying a reset force through the spacer 133 to the valve assembly 92. The override operator member is operable either hydraulically or mechanically to perform the reset function. One end portion of the operator member 170 slides in a sealed relationship through the ring seal 150 in the exhaust body portion 140. The other end portion of the override operator member slides in sealed relationship within a ring seal 171 supported in an internal annular recess in the internal flange portion 155 of the housing 63. The operator member 170 has an enlarged external central flange portion 172 which is engaged at one end away from the valve assembly 92 by an annular override piston 173 which is positioned in the pressure reset chamber 152 around the operator member 170. The piston 173 has a cylindrical wall portion 174 which carries a ring seal 175 which seals with the internal bore wall of the housing section 151. The piston has an internal annular flange portion 180 which carries a ring seal 181 sealing with the outer surface of the reset operator member 170. A spring 182 is confined between the piston flange 180 and the internal annular shoulder 144 of the end portion 140 of the body 62 within the reset pressure chamber 152. A hydraulic pressure applied through the side port 160 acts through the port 161 into the chamber 152 forcing the reset piston 173 toward the valve assembly 92 moving the reset operator member 170 toward the valve assembly for shifting the valve assembly in the reset mode. The piston 173 may move toward the valve assembly until the end edge of the piston skirt 174 engages the adjacent face of the section 140 of the body 62. The spring 182 biases the piston 173 to the end position shown in FIG. 2A which is the normal position of the piston except during hydraulic reset.

Figure 2D:
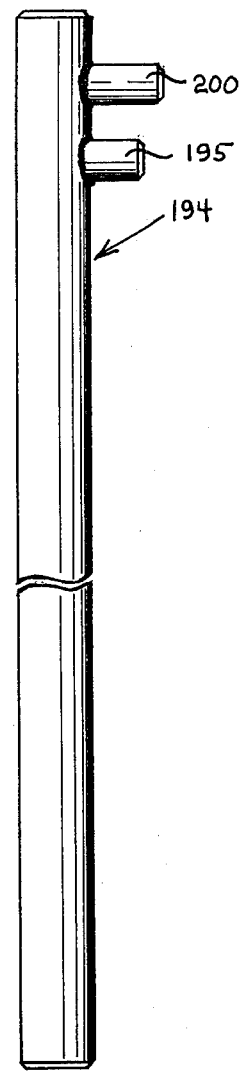

As shown in FIG. 2A an override sleeve 183 is slidably positioned within the portion 154 of the housing 63. The override sleeve has a central external annular reset slot 184 and external annular ring seals 185 positioned in external annular recesses longitudinally spaced on opposite sides of the slot 184 for sealing with the inner bore of the housing portion 154. The manual reset sleeve is disposed between identical washers 190 and 191. The washer 190 is positioned between an end edge of the sleeve 183 and an end edge of the reset operator member 170 so that a force applied to the operator sleeve in the direction of the valve assembly 92 is transmitted through the washer 190 to the operator member. As best seen in FIG. 4C the side wall of the portion 154 of the housing 63 has a longitudinal oval-shaped slot 192 and a circular hole 193 circumferentially spaced from the slot 192. The slot 192 and hole 193 provide access to the manual reset sleeve 183 for manually moving the sleeve longitudinally toward the valve assembly 92. A manual reset handle 194 is shown FIG. 2D. The handle includes a pivot pin 195 and a reset lug 200 which are secured as by welding in spaced relation along one end portion of the handle aligned perpendicular to the longitudinal access of the handle. For resetting the pilot valve the handle 194 is held substantially perpendicular to the override housing 63 with the pivot pin 195 being inserted into the housing hole 193 and the reset lug 200 being inserted through the slot 192 in the housing into the reset groove 184. The handle is then manually manipulated to pivot the handle about the pin 195 so that the lug 200 engaged in the groove 184 forces the reset sleeve 183 toward the valve assembly 92. The sleeve 183 applies the force through the washer 190, the reset operator member 170 and the spacer 133 to the valve assembly 92 for shifting the valve assembly longitudinally in accordance with the reset procedure to be described in further detail hereinafter.

Figure 5:
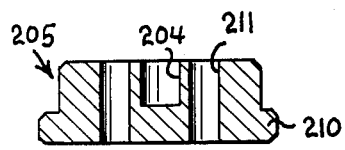
FIG. 5 is a view in cross-section of the reset plunger spring guide of the pilot valve of FIGS. 2A–2C.

A valve assembly opening plunger 201 is positioned for longitudinal movement along the axis of the pilot valve body from the housing 64 through the housing 63 into the body 62. The opening plunger passes through the washer 191, the reset sleeve 183, the washer 190, the reset operator member 170, the spacer 133, and into the valve assembly cap 111 and seal 110 against the ball valve 112. The reset plunger has a reduced end portion 202 which passes through an internal flange end portion of the operator member 170 which is provided with an internal annular seal 203 providing a sliding seal relationship between the operator member 170 and the reduced end portion of the opening plunger. The end portion of the opening plunger away from the valve assembly 92 fits into a blind bore 204 of a circular spring guide 205 which is positioned for longitudinal movement within the housing 64. The spring guide 205, as shown in FIG. 5, includes an external annular flange portion 210 and diametrically opposed spaced holes 211 which are parallel to each other, aligned with the longitudinal axis of the guide, and located on opposite sides of the blind bore 204. An electrical emergency shut down reset pin 212 is position in each of the bores 211 for manual reset of the electrical emergency shut down system. The housing 64 and the housing 63 are secured together by threading at adjacent ends to provide an internal annular stop shoulder 213 which is engageable by the spring guide 205 to limit the movement of the spring guide toward the valve assembly 92 when the pilot valve operates to shut the safety valve. The reset pins 212 function only during manual reset of the electrical emergency shut down system. An opening spring 214 within the housing 64 bears in one end against the spring guide 205 and at the opposite end against an end surface of an adjusting sleeve 215 which threads into the housing 64 and is adjustable to vary the compression on the spring 214 for setting the opening pressure of the pilot valve. The force of the compressed spring 214 is applied through the spring guide 205 to the end of the opening plunger 201.

Figure 6:
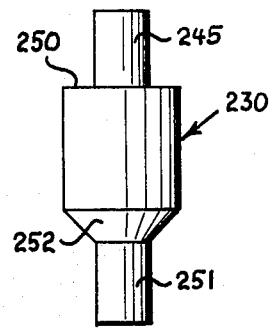
FIG. 6 is a side view in elevation of the electrical emergency shutdown plunger of the pilot valve of FIGS. 2A–2C.

An electrical emergency shut down system 220, FIGS. 2B, and 2C includes a spring 221, a spring guide 222, a locking ball cage member 223, a spring retainer 224, a plurality of locking balls 225, a locking plunger 230, and a spring 231. The spring guide 222 has an external annular end flange 232 engaged by the end of the spring toward the valve assembly 92. The spring guide 222 and the locking ball cage member 223 are threaded together in telescopic relationship as illustrated to permit adjustment of the distance between the locking balls and the spring retainer flange 232 so that the system may be properly spaced out relative to the opening spring guide 210. The spring retainer 224 has an internal annular flange 233 which is engageable with an external annular shoulder surface 234 on the locking ball cage member 223 limiting the movement of the cage member and the spring guide 222 in the direction of the valve member 92. The housing 65 telescopes over the end of the housing 64 as shown in FIG. 2B. The housing 64 has an external annular recess 235 which receives circumferentially spaced cap screws 240 secured through the enlarged end portion of the housing 65 for releasably connecting the housing 65 on the end of the housing 64. The housing 65 is constructed to be quickly removed and replaced on the housing 64 for access to the adjusting sleeve 215 and the locking ball cage 223. The housing 65 has an internal annular flange 241 which is provided with a sloping annular lock shoulder 242 engageable by the locking balls 225 for locking the electrical emergency shut down system out of service until released by an electrical failure. The cage member 223 has a inwardly opening blind bore 243 which houses the spring 231 and the plunger 230. The wall of the cage member 223 along the bore portion 243 is provided with circumferentially spaced holes 244 in which the locking balls 225 are loosely fitted so that the balls may freely move radially inwardly and outwardly. As best seen in FIG. 6 the plunger 230 has one end pin portion 245 which fits within the spring 231 and an external annular stop shoulder 250 engaged by one end of the spring 231 while the other end of the spring seats against the bottom surface of the bore 243 of the cage member 223. The other end portion of the plunger 230 is reduced along an end pin portion 251 and provided with a sloping cam release surface 252 which allows the locking balls 225 to move inwardly releasing from the locking surface 224 and cams the balls outwardly against the locking surface during the release and recess functions of the electrical emergency shut down system. The spring 231 biases the plunger 230 outwardly toward a locking position within the balls 225.

Figure 6A:
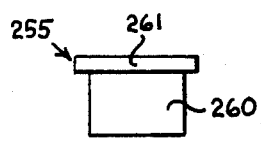
FIG. 6A is a side view in elevation of the electromagnet pole piece of the pilot valve of FIGS. 2A–2B.

The housing 65 as shown in FIG. 2C has a cylindrical reduced end portion defined by the wall section 253 which is provided with an external annular flange 254. The wall portion 253 houses the magnet pole piece 255 shown in complete detail in FIG. 6A. The pole piece is a magnetic material preferably solid having a cylindrical body portion 260 provided with an external annular end flange 261. A spring 262 around the portion 260 of the pole piece is confined between the flange 261 and the end face of the electromagnet 70. The spring biases the pole piece toward the plunger 230 so that when the electromagnet is energized the pole piece is held tightly against the electromagnet compressing the spring 262 and when deenergized the magnet releases the pole piece allowing the spring 262 to expand forcing the plunger 230 against the spring 231. When the deenergized electromagnet releases the pole piece 255 the spring 262 expands forcing the plunger 230 against the spring 231 moving the locking surface 252 on the plunger in alignment with the locking balls 225 so that the locking balls may move inwardly around the end portion 251 of the plunger releasing the balls from the locking surface 242 of the housing 65 activating the electrical emergency shut down system as explained in more detail hereinafter.

Figure 7:
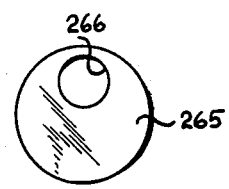
FIG. 7 is a view in elevation of a solenoid retainer used in the pilot valve of FIGS. 2A–2C.

The electromagnet 70 has an end flange 263 through which bolts 264 of the magnet housing extend. A retainer 265 is fitted on each of the bolts 264 each held by a nut 270 on the bolt against the end flange 254 of the housing 65. A spacer 271 is fitted on each of the bolts between the end face of the electromagnet flange 263 and the retainer 265. As shown in FIG. 7 each of the retainers 265 is a circular member having an eccentrically positioned hole 266 for the bolt 264. The eccentric positioning of the hole permits a major portion of the retainer to overlap the housing flange 254 for holding the electromagnet on the housing flange. It is to be understood that the electromagnet is structurally secured with the housing 65 of the pilot valve body only by the bolts 264. The pole piece 255 is free to move within the cylindrical end portion of the housing 65 between one end position as shown in FIG. 2B at which the pole piece is magnetically attracted against the electromagnet and the release position upon power failure when the spring 262 expands thereby moving the pole piece away from the electromagnet.

The electromagnet 70 is a commercially available unit manufactured by R. G. Laurence Company, Inc., Tenafly, N.J., Model ECM as illustrated in Manufacturer's Drawing Nos. 4263-B. The electromagnet is available through Otis Engineering Corporation, Dallas, Tex., under Part No. 92M24. One particular electromagnet employed with a prototype of the pilot valve of the invention provided a 70 lb. hold capacity drawing one amp at 24 volts dc.

In operation the pilot valve P1 is connected with the safety valve S1 as previously described and illustrated in FIG. 1. The pilot valve is designed to be sensitive to and functions in response to low-pressure fluctuation of line or well pressure within the body 30 of the safety valve. The pilot valve is set by adjustment of the spring 214 which is compressed by the adjusting sleeve 215 to monitor abnormal decreases in valve body pressure. When the valve body pressure drops below the pilot's setting, the pilot is designed to block supply pressure to the pilot valve from the valve body and to exhaust the actuator cylinder 40 of the safety valve allowing the valve to close. The pilot valve is also designed to respond to the loss of an electrical signal to the electromagnet 70. The failure of the electrical signal may come about from a failure of electrical power to well producing apparatus which would require or make it desirable to shut down the well. Of course, the electrical signal failure could be arranged to be responsive to numerous other well producing operating conditions which would make shut down of the well desirable such, for example, as fire which would produce sufficient heat to cause a heat responsive switch to open closing off power to the electromagnet.

FIGS. 2A thru 2C illustrate the actual positions of all of the parts of the pilot valve P1 and FIG. 8 schematically shows the positions of the major parts of the valve when the valve is in operating service on the safety valve as illustrated in FIG. 1. Referring first to FIG. 8, the line pressure in the safety valve body is applied from the body through the passage system 45, the fitting 73, the valve 72, and into the pilot valve body where the pressure acts around the velocity check valve 82 through the seat 80 and outwardly through the side port into the line 42 extending to the safety valve actuator cylinder 40 in which the pressure acts downwardly on the piston 35 holding the safety valve open. Static no-flow conditions exist at this time so the velocity check valve 82 is off seat. The line pressure holds the pilot valve assembly 92 seated against the shoulder surface 130 with the ball valve 112 seated on the seal 110. The pressure acting across the ball valve 112 holds the valve against the end of the opening plunger 201 holding the plunger at a position at which the pilot valve opening spring 214 is compressed. The electromagnet latch system holds the electrically emergency shut down system spring guide 222 in a cocked position with spring 222 compressed. The passages leading to the exhaust side port 132 are closed by the valve assembly 92 so that the line pressure is confined to the safety valve actuator cylinder 40. At this time there is no pressure in the hydraulic reset side port 160.

More specifically when the pilot valve P1 is in service as schematically represented in FIG. 8 the specific positions of all of the parts are as shown in FIGS. 2A thru 2C. The pressure from within the safety valve body is applied into the pilot valve through the bore 85 of the lower body 60. Since no flow is occuring from the safety valve body into the pilot valve, when the pilot valve is inserted the velocity check valve 82 is held by gravity off the seat surface 81 so that the pressure is applied around the check valve through the bore of the seat 80 and the bore of the backup ring 90 around the end portion 115 of the plunger of the valve assembly 92. The pressure is applied into the pilot body 94 and outwardly through the side port 95 into the line 42 through which it is communicated to the safety valve operating cylinder. There is sealing contact between the plunger central portion 122 and the ring seal 123 and the spring 113 holds the ball valve 112 on the seat 110. Thus, the line pressure within the body 94 holds the pilot valve assembly 92 at the closed end position as shown in FIG. 2A against the shoulder surface 130. The ball valve 112 bears against the end edge of the opening plunger 201 which is seated at the opposite end in the spring guide 205 holding the guide away from the shoulder surface 213 compressing the pilot valve opening spring 214. The compression of the spring 214 is adjusted by the position of the sleeve 35 so that when compressed by the spring guide 205 line pressure is sufficient to apply enough force to the ball 112 to hold the opening spring compressed. The seal 123 prevents any flow along the plunger of the valve assembly 92 while the ball 112 prevents flow through the valve assembly so that no flow may occur in the in service condition of the pilot valve to the exhaust side port 132.

When the pilot valve P1 is in service as described the hydraulic reset system and the electrical emergency shut down system are inoperable. As shown in FIG. 2A the spring 182 bearing against the hydraulic reset piston 173 holds the piston at the end position in the chamber 152. Since the line pressure acting on the valve assembly 92 is holding the valve assembly at the end position described, the spacer 133 cannot move downwardly, or to the left as shown in FIG. 2A, and thus the reset operator member 170 is held as shown in FIG. 2A. Thus, the override sleeve 183 remains at the central position as shown.

Referring particularly to FIG. 2C with the pilot valve P1 in service the parts of the electrical emergency shut down system which serve as the trigger remain "cocked". The electromagnet 70 is energized holding the pole piece 255 against the end face of the plate 263 of the electromagnet compressing the spring 262. Since the pole piece is held at an end position the spring 231 acting against the plunger 230 holds the plunger at an end position at which the locking balls 225 are held outwardly by the side wall surface of the central portion of the plunger. The balls are held against the locking surface 242. Since the balls are disposed through the holes 244 in the member 223 the spring guide 222 which is secured on the member 223 is held at an end position keeping the spring 221 compressed against the spring retainer 224. Thus the spring guide 222 applied no force to the opening spring guide 205. So long as the electromagnet remains energized the trigger assembly of the electrical emergency shutdown system will remain so cocked. So long as line pressure holds the ball 112 on seat at the end position of the valve assembly 92 and the trigger assembly of the electrical emergency shut down system is cocked, the pilot valve remains in service as illustrated in FIGS. 2A, thru 2C and 8.

The pilot valve P1 may operate to release the pressure in the operating cylinder 40 of the safety valve S1 either in response to a pressure decrease in the safety valve body which is below the setting for which the opening spring 214 is adjusted, or by deenergizing the electromagnet 70 to release the trigger assembly of the electrical emergency shut down system. First, the operation of the pilot valve in response to a reduction in pressure in the body of the safety valve will be considered as schematically represented in FIG. 9. The pressure reduction is communicated to the ball valve 112 so that the ball valve moves off seat removing the holding force against the end of the opening plunger 201 allowing the spring 214 to expand until the spring guide 205 engages the shoulder 213. Looking also at FIG. 2A the pressure reduction is communicated through the bore 85, around the velocity check valve 82, through the seat 80 and the retainer 90 along the plunger to the plunger ports 121. The pressure reduction is further communicated along the bore 120 of the plunger to the ball valve 112 so that the force of the pressure against the ball valve is reduced to a value which allows the spring 214 acting through the guide 205 against the end of the opening plunger 201 to move the ball 112 off seat against the spring 113. When the ball moves off seat flow occurs along the paths described from the bore 85 around the ball valve 112, through the seat 110 and the cap 111 of the valve assembly. The flow continues into the spacer 113 and outwardly from the spacer through the holes 135 in the spacer into the side exhaust port 132 of the exhaust body. Simultaneously with the pressure induction communicated from the safety valve body and the flow through the bore 85 of the pilot valve to the exhaust port 132 flow occurs inwardly through the pilot valve side port 95 in the body member 94 from the line 42 leading to the safety valve actuator cylinder 40. The flow from the safety valve body through the bore 85 of the pilot valve moves the velocity check valve 82 on seat thus shutting off any further flow through the pilot valve from the safety valve body. The pilot valve assembly 92, however, remains open so that the fluid in the safety valve actuator cylinder 40 continues flowing through the line 42 into the port 95 of the pilot valve. The fluid flowing from the safety valve actuator cylinder flows into the ports 121 of the plunger of the pilot valve assembly 92 passing along the valve assembly and the previously described passages of the pilot valve body to the exhaust port 132 through which the fluid flows to atmosphere. The reduction of pressure in the actuator cylinder 40 permits the spring 43 of the safety valve to force the valve stems upwardly closing the safety valve during the bleeding down of of the safety valve to permit the valve to close. The hydraulic reset system and the electrical emergency shut down system remain in the previously described conditions. FIG. 9 represents the relative positions of the major parts of the pilot valve during and subsequent to operation in response to low pressure in the safety valve body. The velocity check valve 82 remains on seat if there is any pressure in the safety valve body thereby isolating the pilot valve from the safety valve body and keeping the exhaust passages open leading to the actuator cylinder of the safety valve. The pilot valve is returned to service and the safety reopened hydraulically either from a remote location or at the pilot valve if shut down occurs due to low pressure or locally only if the shut down occurs due to electrical failure. Both methods of resetting the pilot valve are described hereinafter.

FIG. 10 schematically illustrates the operation of the pilot valve P1 in response to an electrical failure. With the pilot valve in service as previously described with all parts in the positions represented in FIGS. 2A thru 2C, and 8, an electrical failure deenergizes the electromagnet permitting the spring 262 to expand forcing the pole piece 255 awat from the electromagnet plate 263 against the plunger 230. The plunger 230 is moved against the spring 231 into the retainer 223 until the cam surface 252 on the plunger passes the locking balls 225. When the cam surface 252 passes the locking balls 225 the force of the compressed spring 221 acting against the flange 232 applied along the spring guide 222 and the retainer 223 against the locking balls causes the locking surface 242 of the housing 65 to cam the locking balls inwardly around the reduced end portion 251 of the plunger so that the locking balls are released from the surface 242. Release of the locking balls from the surface 242 allows the spring 221 to expand moving the entire trigger assembly including the guide 222, the member 223, the locking balls 225, the plunger 230 and the spring 231 toward the operating spring guide 205. When the end edge of the flange 232 engages the spring guide 205 the force of the compressed spring 221 added to the force of the compressed spring 214 provided sufficient total force on the opening plunger 201 to push the ball valve 112 of the valve assembly 92 off seat away from the seal 110 as shown in FIG. 10. As soon as the ball valve moves off seat flow occurs from the safety valve body through the pilot valve bore 85 and along the pilot valve assembly 92 to the exhaust port and simultaneously from the actuator cylinder 40 of the safety valve through the pilot valve side port 95 to the exhaust port of the pilot valve. The flow from the safety valve body forces the velocity check valve 82 on seat isolating the pilot valve from the safety valve body pressure and allowing the pilot valve to bleed down the actuator cylinder of the safety valve so that the spring 43 of the safety valve closes the valve. The flow occurs both from the safety valve body and from the actuator cylinder of the safety valve along the previously described paths. Once the safety valve is closed by operation of the pilot valve the pilot valve remains isolated from the safety valve by the velocity check valve if there is any pressure in the body of the safety valve. The pilot valve remains inoperative until reset manually as the trigger assembly of the pilot valve cannot be remotely recocked.

When the pilot valve has operated in resonse to low pressure it may be reset either hydraulically or manually. The positions of the various major parts of the pilot valve when operated in response to a low pressure are represented in FIG. 9. FIG. 12 schematically represents the hydraulic resetting of the pilot valve. Remote facilities, not shown, may be connected into the side port 160 of the pilot valve for applying the necessary pressure for reopening. Also it will be recognized that a pump may be connected at the pilot valve for applying such hydraulic pressure to the port 160. Referring both to FIGS. 2A and 12 the pressure is applied through the side port 160 in the override housing 63 and the port 161 into the housing chamber 152 behind the reset piston 173. The piston is forced toward the valve assembly 92 against the spring 182 moving the reset member 170 toward the valve assembly. The end edge of the reset member 170 engages the spacer 133 forcing the spacer against the end edge of the cap 105 of the valve assembly 92. As shown in FIG. 9 the ball valve 112 is being held off seat by the end edge of the opening plunger 201. The force being applied to the cap and seat of the valve assembly 92 from the piston 173 forces the cap and seat toward the ball valve 112 away from the end of the opening plunger 201. As soon as the seat 110 engages the ball valve 112 the ball valve is moved away from the opening plunger as represented in FIG. 12 thus closing the valve assembly 92 shutting off the side port 132 from the pilot valve. After the seal 110 picks up the ball valve 112 closing the valve assembly 92 the end portion 115 of the valve assembly plunger engages the velocity check valve 82 moving the check valve off the seat surface 81 admitting the line pressure from the body of the safety valve S1 to the pilot valve through the bore 85. The increase in pressure from the safety valve body is communicated past the velocity check valve which is held off seat by the plunger tip. The increase in pressure is thus communicated past the check valve through the seat 80 and the retainer ring 90 around the plunger tip to the port 95 from which the pressure increase passes through the line 42 into the actuator cylinder 40 of the safety valve. When the pressure into the actuator cylinder reaches a sufficient level, the piston 35 is forced downwardly reopening the safety valve. When the safety valve is fully reopened static flow conditions are reached in the pilot valve and the actuator cylinder of the safety valve. The hydraulic pressure must be maintained through the side port 160 of the pilot valve until the safety valve is fully reopened at which time the hydraulic reset pressure is no longer applied to the side port. The spring 182 expands returning the piston 173 to the end position in the chamber 152 illustrated in FIG. 2A. The line pressure against the valve assembly 92 over the area defined within the ring seal 123 forces the valve assembly back to the end position shown in FIG. 2A. As the valve assembly 92 returns to the operating end position the end edge of the cap 105 engages the spacer 133 which pushes the reset operator member 170 back to the position shown in FIG. 2A while at the same time the ball valve 112 pressing against the end edge of the opening plunger 201 returns the plunger along with the spring guide 205 to the position of FIG. 2A compressing the spring 214. The pilot valve thus returns to in service condition as shown in FIGS. 2A and 2B with the velocity check valve 82 moving off seat as shown in FIG. 8 when static conditions are established. When the pilot valve is operated in response to a low pressure it is also reset manually at the valve by use of the reset handle 194 as shown in FIG. 2C in accordance with the procedure schematically represented in FIG. 13. The reset handle 194 is held by the operator substantially perpendicular to the body of the pilot valve with the end of the handle including the pivot pin 195 and the reset lug 200 being located over the hole 193 and the slot 192 as best seen in FIG. 4C. The pivot pin is placed in the hole 93 while the reset lug is inserted through the slot 192 into the reset groove 184 of the override sleeve 183. In the orientation of the pilot valve represented in FIG. 4C the handle is then manually rotated clockwise about the pivot pin 195 thereby moving the reset lug 200 along a clockwise arc in the slot 192. Since the reset lug is inserted in the groove 184 of the override sleeve 183, the sleeve is moved by the lug toward the pilot valve assembly 92. The force applied to the override sleeve is transmitted through the washer 190 to the reset operator member 170 which is shifted against the annular spacer 133 applying a longitudinal force to the end of the cap 111 of the valve assembly 92. The ball valve 112 of the assembly 92 at the initiation of the manual reset is being held off seat away from the annular seal 110 against the compressed spring 113. As the reset handle 194 is rotated clockwise the force applied by means of the reset lug 200 thus moves the cap 111, the plunger 104, and the seal 110 away from the opening plunger 201. As soon as the seal 110 engages the ball 112 the spring 113 holds the ball 112 against the seat surface of the seal 110 as the ball is moved away from the tip end of the opening plunger 201 which had been holding the ball 112 open. At the moment the ball 112 goes on seat on the seal 110 the valve assembly 92 is closed so that no further exhaust occurs through the side port 132. The closed velocity check valve 82 is engaged by the end edge of the plunger portion 115 moving the velocity check valve off the seat as the valve assembly 92 is closed by the ball valve 112 going on seat on the seal 110. The open velocity check valve then allows flow from the safety valve body to the port 95 through the flow passes to the actuator cylinder 40 of the safety valve S1 through the line 42 to repressure the safety valve for reopening the valve. When the safety valve actuator cylinder is sufficiently repressured to reopen the safety valve the pressure rises to a sufficient level also to force the pilot valve assembly 92 back away from the velocity check valve to seat against the surface 130 which returns the opening plunger 201 to the energized condition at which the spring guide 205 compresses the spring 214 moving the guide away from the shoulder surface 123. Static pressure conditions are again reached in the pilot valve and the safety valve hydraulic control system holding the safety valve open and returning the various parts of the pilot valve to in service positions so that the pilot valve is again ready to operate for closing the safety valve in the event that the predetermined low pressure or electrical failure develops.

In the event that the pilot valve P1 as operated to close the safety valve in response to electrical failure it is necessary to reset the pilot valve assembly 92 by either the hydraulic or manual procedure described and to manually reset or cock the trigger assembly of the emergency electrical shut down system. In resetting the pilot valve after emergency electrical shut down it is necessary to first recock the trigger assembly before placing the pilot valve back in service by either of the previously described reset procedures. This prior recocking of the trigger assembly is essential because at the time that the trigger assembly fired the pilot valve the force of the trigger assembly spring 221 and that of the opening spring 214 were applied to the opening plunger 201 and both springs continue to press against the opening plunger until both the trigger assembly and the pilot valve assembly 94 are restored to service. The line pressure which normally returns the pilot valve to an in service condition is not sufficient when applied to the ball valve 112 to compress both the spring 221 and the spring 214 for if such were the case the force of the two springs would not be adequate to operate the pilot valve for electrical emergency shutdown. The reset handle 194 is used to cock the trigger assembly. The handle is positioned as previously described inserting the pivot pin 195 into the hole 193 of the override housing 63 and inserting the reset lug 200 through the slot 192 of the housing into the reset groove 184 of the sleeve 183. The handle 194 is then turned counter clockwise to force the override sleeve 183 toward the electromagnet 70. The force against the override sleeve is applied to the washer 191 which applies the force to the pins 212. Since the pins 212 are longer than the thickness longitudinally of the spring guide 205 the ends of the pins 212 toward the electromagnets are pushed through the spring guide 205 to engage the end surface of the trigger assembly spring guide 222 forcing the guide 222 and the connected retainer 223 toward the electromagnet compressing the spring 221. As this procedure is being carried out it is necessary to restore power to the electromagnet 70. When the retainer 223 has been forced toward the electromagnet to the point at which the locking balls 225 which are carried along by the retainer are aligned with the locking shoulder 242 in the housing 65, the force of the spring 231 against the plunger 230 causes the cam surface 252 on the plunger to cam the locking balls 225 outwardly against the locking surface 242 until the outside wall surface of the central portion of the plunger 230 moves within the locking balls holding the locking balls outwardly against the locking surface 242 thus locking the retainer 223 and the spring guide 222 at the position shown in FIG. 2B at which the spring 221 is compressed and the end edge of the spring guide 222 at the flange 232 is no longer pressing against the spring guide 205. As the trigger assembly is cocked the end edge of the plunger 230 nearest the electromagnet also forces the pole piece 255 against the energized electromagnet compressing the spring 262. So long as the electromagnet is energized the pole piece is held against the plate 263 with the end edge of the plunger 230 being engaged with the pole piece and holding the locking balls 225 in the position at which the trigger assembly of the electrical emergency shut down system is cocked. Thereafter the pilot valve may be reset manually by rotating the reset handle 194 clockwise or the pilot valve may be reset hydraulically following the previously described procedures. With the electrical emergency shut down system recocked and the pilot valve restored to service, the pilot valve then may again operate in response to either the predetermined low pressure or to the electrical failure.

Figure 14:
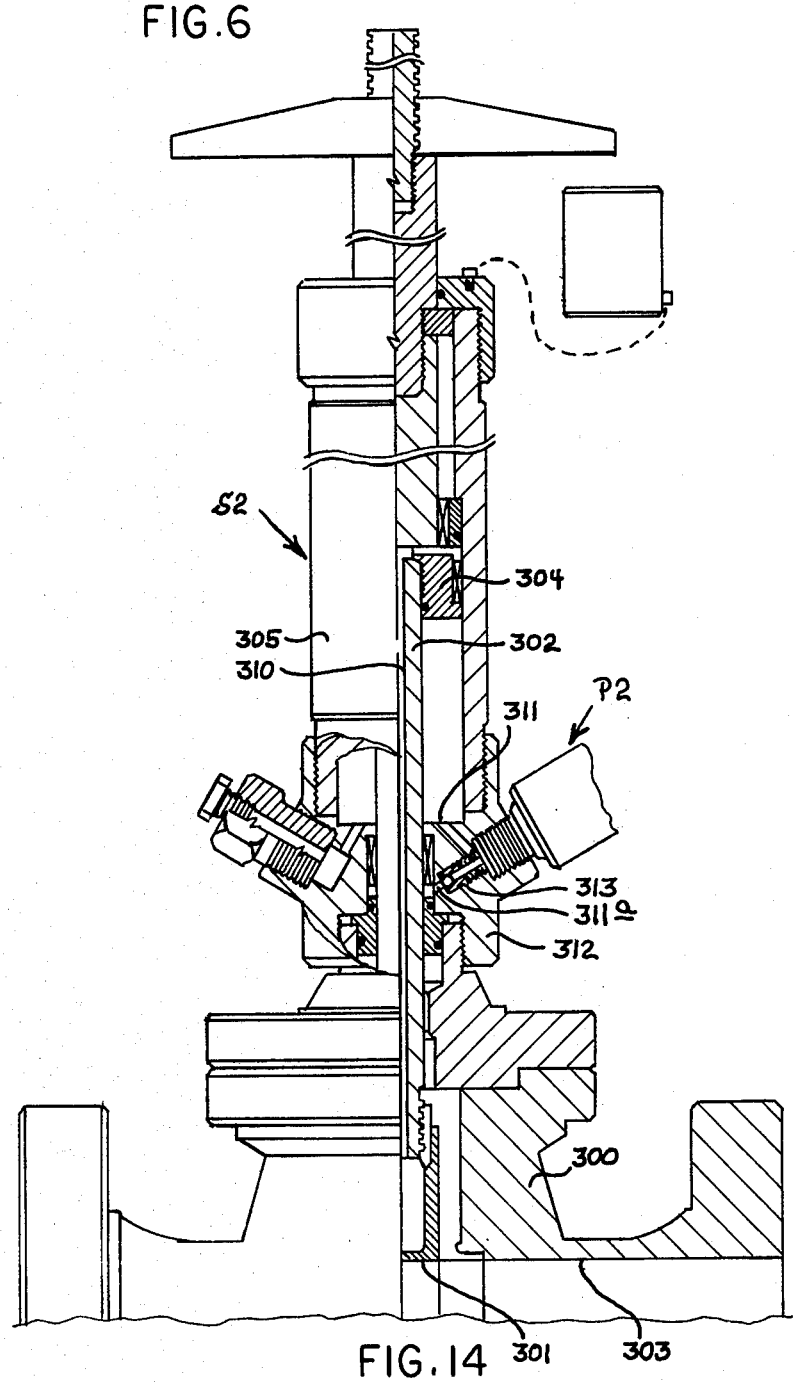
FIG. 14 is a schematic view in section and elevation illustrating another embodiment of the pilot valve of the invention installed on a different form of surface safety valve.
Figure 14A:
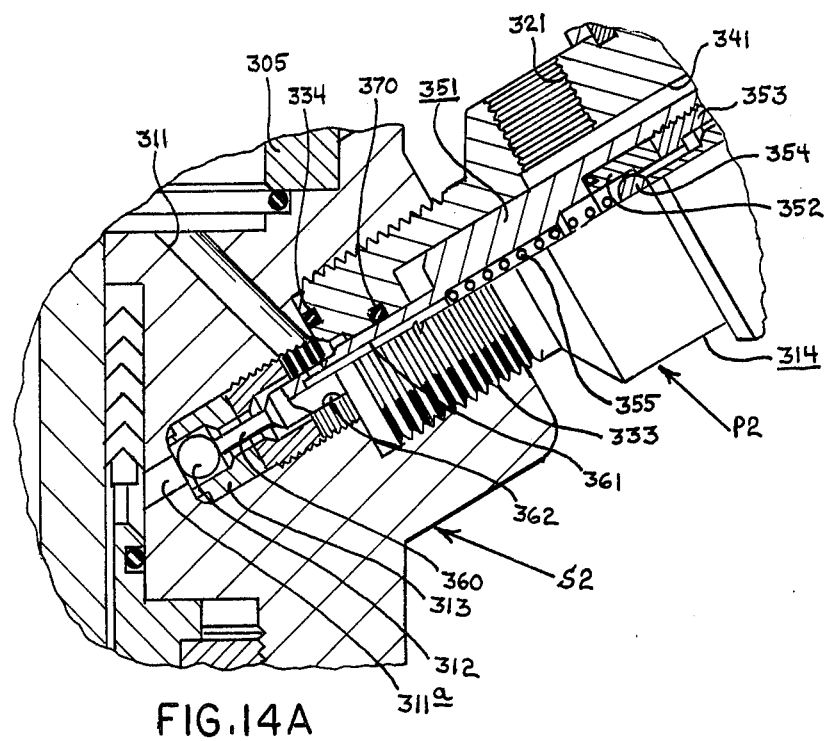
FIG. 14A is an enlarged fragmentary view in section of the velocity check valve and the pilot valve connection into the safety valve as shown in FIG. 14.

Another form of pilot valve P2 embodying the features of the invention is shown installed on a different type of safety valve S2 in FIG. 14. The safety valve S2 includes a velocity check valve which eliminates the need for such a check valve in the modified pilot valve P2. The safety valve S2 is a standard Otis Engineering Corporation valve designated as Type X Otis Actuator/Gate Valve Combination shown at page 25 in the Otis Engineering Catalog *Surface Safety Equipment and Systems,* supra. The safety valve S2 includes a body 300, a valve member 301 in the body mounted on a stem 302 for movement between an open position as shown and a lower closed position at which the flow passage 303 through the body is shut off by the valve. An operator piston 304 is mounted on the stem within an actuator cylinder 305. A flow passage 310 and the stem communicates line pressure within the valve body into the actuator cylinder above the piston 304. Pressure also acts within the valve body across the lower end of the valve member 301. A flow passage system including a passage 311 communicates the pressure in the valve body through the pilot valve P2 into the actuator cylinder below the piston 304. When the pilot valve is open allowing the pressure into the cylinder 305 below the piston 304 such pressure in combination with the pressure in the body below the valve member 301 exceeds the pressure communicated into the cylinder above the piston through the passage 310 so that the piston and stem are held at an upper position at which the valve member is open. When the pilot valve P2 operates to exhaust the pressure in the operator cylinder below the piston 305 the line pressure above the piston 304 in the actuator cylinder exceeds the line pressure on the lower end of the valve member 301 so that the valve is shifted downwardly to close the valve. The pilot valve P2 is operable responsive to both a low pressure and electrical failure and may be reset both hydraulically and manually.

As shown in FIG. 14 the safety valve S2 has a velocity check valve 312 which is engageable with a valve seat 313 for shutting off flow from the valve body through the pilot valve P2 into the safety valve operator cylinder 305. The pilot valve P2 is therefore designed to be compatible with the safety valve S2 utilizing the velocity check valve 312 during the operating and reset functions of the pilot valve.

Referring to FIGS. 15A and 15B, which show the specific details of the pilot valve P2, the pilot valve includes a body or housing formed by a lower body 314, a main body 315, and an electrical emergency shut down housing 320. An electromagnet 70 identical to the electromagnet 70 of the pilot valve P1 is connected on the housing 320. The lower body 314 has a side exhaust port 321 while the main body 315 has a side port 322 for hydraulic reset pressure. Within the pilot valve body are a pilot valve assembly 322 for controlling flow to the exhaust port, a hydraulic reset piston 324 for hydraulically resetting the pilot valve, an opening plunger 325, an override sleeve 330, a pilot opening spring 331, and an electrical emergency shut down trigger assembly 332.

The lower body 314 has a reduced threaded end portion 333 which connects the pilot valve with the body of the safety valve. A ring seal 334 is mounted in the end face of the threaded body section 333 for sealing between the lower body and the safety valve body to prevent leakage from the safety valve body outwardly around the pilot valve body. The lower body 314 has a graduated longitudinal bore including a first portion 335 and a second enlarged portion 340. The bore of the lower body 314 is still further enlarged along an end portion 341 providing communication to the side port 321 from the inward end face 342 of the lower body. The lower body is secured with the main body 315 by a retainer wire 343 fitted within an external annular recess 344 around the body 314 and an internal annular recess 345 in the body 315. Set screws 350 threaded through the body 315 engage the retainer wire locking the bodies 314 and 315 against relative rotation.

The pilot valve assembly 323 includes a graduated plunger 351, a valve seat 352 mounted in the plunger, a retainer 353 holding the seat in place, a ball valve 354 engageable with the seat, and a spring 355 biasing the ball valve toward the seat. The entire valve assembly 323 is movable longitudinally along the bore through the lower body 314 between a first in service end position as illustrated in FIG. 15A and a second opposite end reset position, not shown. The plunger 351 of the valve assembly 323 has a solid end portion 360 which is engageable with the velocity check valve 312 in the safety valve S2 for holding the velocity check valve off seat during reset. The plunger 351 has a graduated blind central bore having a first portion 361 which communicates with side ports 362 in the plunger, a second bore portion 363 which houses the spring 355 and a third stepped bore portion 364 housing the ball valve 354, the valve seat 352 and the retainer 353. A ring seal 365 seals around the valve seat 352 within the stepped bore 364. A ring seal 370 in the lower body 314 around the bore portion 355 seals between the lower body and the plunger of the valve assembly 322. The side ports 362 in the valve assembly plunger communicate with the flow passage 311 for communicating line pressure into the safety valve actuator cylinder 305 and for exhausting the pressure from the cylinder. The main body 315 of the pilot valve P2 has an internal annular flange portion 371 in which the side hydraulic reset port is formed. The body also has a longitudinally aligned port 372 in the flanged portion 371 opening into the port 322 and opening into a hydraulic reset chamber 373 defined in the body 315 with the body 314 below the flanged portion 371 in which the hydraulic reset piston 324 slides. The reset piston has a skirt portion 324a which fits between the body flanged portion 371 and the opening plunger 325. A ring seal 374 carried by the piston skirt portion 324a seals around the skirt portion with the bore through the body flanged portion 371. Another ring seal 375 carried by the piston 324 seals around the piston with the inside wall surface of the body 315 below the flanged portion 371 so that hydraulic pressure supplied into the body through the side port 322 and the port 372 forces the reset piston along the chamber 373 toward the pilot valve assembly 323 for performing the reset function. The piston 324 has an annular flanged portion 380 which is engageable with the inside end face of the valve assembly 323 at the end edges of the plunger 351 and the retainer 353 for shifting the valve assembly to the reset end position.

The override sleeve 330 is slidably disposed around the opening plunger 325 within the body 315 engageable at one end with the end edge 324b of the reset piston skirt for manually moving the reset piston to shift the valve assembly 23 during the reset function of the pilot valve. The override sleeve is an annular member having an external annular groove 330a which is accessible through a longitudinal reset slot 381 in the pilot valve body 315 by the reset lug 200 on the reset handle 194. The body 315 is also provided with a pivot hole, not shown, sized and spaced from the reset slot 381 to receive the pivot pin 195 of the reset handle. The arrangement and sizing of the reset slot and the pivot pin hole for manual reset are identical to the illustration of FIG. 4C showing the corresponding features of the pilot valve P1.

The end of the opening plunger 325 opposite the valve assembly 323 is engaged with a spring guide 382 which couples the opening plunger with the opening spring 331. The spring guide has a central blind recess 383 which receives the end portion of the opening plunger. The spring guide also has diametrically opposed laterally spaced longitudinal bores 384 in each of which is positioned a pin 385 which is engageable at one end with an end face of the manual override sleeve 330. The pins 385 are longer than the longitudinal thickness of the spring guide 382. The spring guide has an external annular flange 390 which is engageable with an internal annular stop shoulder 391 in the body 315 limiting the movement of the spring guide toward the valve assembly 323 in the body. One end of the opening spring 331 bears against the end face of the spring guide 382 away from the valve assembly 323 while the other end of the opening spring 331 bears against an annular adjusting screw 392 threaded into the end of the body 315 facing the electromagnet for adjusting the compression of the spring 331 and thus varying the opening pressure to which the pilot valve responds.

The trigger assembly 332 of the electrical emergency shut down system includes a spring guide 393, a locking ball retainer 394 threaded into the spring guide, locking balls 395, a spring retainer 400, a trigger plunger 401, a trigger plunger spring 402, and a main trigger spring 403 compressed between an end flange 393a on the guide 393 and an end edge of the retainer 400. The threaded connection between the spring guide 393 and the locking ball retainer 394 permits adjustment of the degree of compression in the spring 403 for varying the position of the spring guide relative to the main opening spring guide 382. The locking balls 395 are confined in circumferentially spaced holes 404 in the retainer 394 allowing the balls to move radially between inward release positions and outward locking positions as shown in FIG. 15B. The electromagnetic housing 320 has an internal annular locking shoulder 405 engageable by the locking balls when held in the outward positions illustrated to hold the trigger assembly in the cocked position. The trigger plunger 401 has a reduced end portion 410 and an intermediate cam shoulder 411. The reduced end portion 410 permits the balls to be cammed inwardly from the locking surface 405 to release the trigger system while the cam surface 411 expands the locking balls to the locking position shown upon recocking of the trigger assembly.

The electromagnet 70 is connected with an outwardly extending mounting flange 412 on the housing 320 by the bolts 264, the nuts 270, and the retainers 265 as previously described in connection with the pilot P1. The pole piece 255 and the spring 262 operate in conjunction with the trigger assembly 232 for maintaining the trigger assembly cocked when the pole piece is attracted to the end face of the plate 263 of the electromagnet when the electromagnet is energized. When the electromagnet is deenergized by an electrical failure the pole piece is released allowing the spring 262 to expand forcing the pole piece against the end of the trigger plunger 401 for releasing the trigger assembly of the emergency electrical shutdown system. The housing 320 is secured with the reduced end portion 316 of the body 315 by a retainer wire 413 which fits within aligned external and internal annular recesses in the body 315 of the housing 320 respectively. Set screws 414 are threaded through the housing 320 against the retainer wire. A side opening 415 is provided in the housing 320 closed by removable cover 420 which permits access to the interior of the housing for adjusting the opening spring adjusting screw 392. The adjusting screw 392 has circumferentially spaced holes 421 for engagement by a spanner wrench to rotate the adjusting screw for changing the compression in the opening spring 331 to vary the opening pressure to which the pilot valve responds.

The various operational steps of the pilot valve P2 are the same as those for the valve P1 as illustrated schematically in FIGS. 8—13 inclusive. FIGS. 15A and 15B represent the relative positions of the various parts of the valve P1 when the valve is in service on the safety valve S2 with the line pressure within the safety valve body 300 communicated from the safety valve body through the valve body passage 311a, around the velocity check valve 312 through the velocity check valve seat 313 along the tip of the plunger 351 of the valve assembly 323 and into the passage 311 to the actuator cylinder 305 of the safety valve S2. Gravity keeps the ball check valve 312 off seat during the static flow conditions when the pilot valve P2 is in service and the safety valve S2 is thus open due to the pressure of line fluid within the actuator cylinder of the safety valve. The pilot valve remains in service until either a pressure reduction occurs in the safety valve body below the level for which the pilot valve is set, or an electrical failure occurs deenergizing the electromagnet 70.

If the pressure within the safety valve S2 drops below a predetermined level, the pressure reduction is communicated past the velocity check valve 312 along the end of the prong 351 of the valve assembly 322 into the side ports 362 of the prong and along the central bore portions 361, 363, and 364 to the ball valve 354. The reduced pressure against the ball valve relative to the pressure applied by the opening spring 331 through the spring guide 382 and the opening plunger 325 against the other side of the ball valve 354 allows the opening spring to push the opening plunger to move the ball valve 354 off the seat member 352. As soon as the ball valve 354 moves off seat flow begins from within the valve body through the passage 311a around the velocity check valve 312 moving the check valve on seat against seat member 313 and simultaneously flow occurs from the actuator cylinder 305 through the safety valve body passage 311 around the prong 351 to the side ports 362 in the probe. Since the flow is now shut off by the velocity check valve 312 from within the valve body, flow can only occur from the actuator cylinder of the safety valve. The pressure in the actuator cylinder is then bled down through the ports 362 along the central bore portions of the plunger 351 of the valve assembly 323 around the ball valve 354 which is being held off seat by the opening prong 325. When the opening spring 331 operated the opening prong the flange 391 of the spring guide 382 seated against the internal stop shoulder 391 of the body 315. The flow past the ball valve 354 moves within the seat 352 and the retainer 353 along the opening prong to the ports in the flange 380 on the cylinder 324. Pressure is then bled down through the chamber 373, the lower body passage 341, and the side exhaust port 321 to the atmosphere reducing the pressure to atmospheric within the actuator cylinder 305 of the safety valve so that the pressure within the safety valve body applied upwardly through the stem passage 340 to the top of the piston 304 closes the safety valve S2. Until the pilot valve P2 is reset the opening plunger 325 holds the ball valve 354 off seat. Since the pilot valve operated in response to a low pressure the electrical shutdown trigger assembly 332 remains cocked.

The pilot valve P2 may be reset hydraulically either remotely or at the valve depending upon the particular manner in which the valve is fitted. In either instance the hydraulic pressure for resetting the valve is applied through the side port 322 and the ports 372 against the reset piston 324 in the chamber 373. The hydraulic pressure against the reset piston 324 forces the piston toward the valve assembly 323. The end edge of the flange 380 on the reset piston engages the adjacent end edges of the retainer 353 and the plunger 351 of the valve assembly forcing the valve assembly along the bore of the lower body 314 until the shoulder surface 366 on the valve assembly plunger engages the internal stop shoulder 336 of the lower body 314 which defines the reset end position of the valve assembly. As the valve assembly is shifted toward the reset position the seat 352 picks up the ball valve 354 moving the ball valve away from the end of the opening prong 325 closing the valve assembly 323 so that no further flow may occur through the pilot valve from the actuator cylinder of the safety valve. As the valve assembly 323 is closed the movement of the valve assembly opens the velocity check valve 312 which is engaged by the end edge of the tip 360 of the valve assembly plunger 351 moving the velocity check valve off seat so that pressure within the safety valve body is again communicated around the valve assembly plunger 351 into the passage 311 of the safety valve body leading to the safety valve actuator cylinder 305. As the pressure increases in the actuator cylinder the safety valve is reopened. When it is determined that the safety valve is fully opened the operator shuts off the application of the hydraulic reset pressure into the pilot valve through the side port 322. The pressure reduction against the reset piston 324 permits the higher pressure from the body of the safety valve being applied into the pilot valve body over the area of the pilot valve assembly plunger defined by the ring seal 370 to shift the pilot valve assembly 323 back to the operating end position illustrated in FIG. 15A. The return of the valve assembly 323 to the operating position moves the reset piston 324 and the opening plunger 325 back to operating positions at which the spring 331 is compressed again by the spring guide 382. As the valve assembly 322 is returning to operating position the force of the ball valve 354 against the end of the plunger 325 recompresses the open spring 311. The plunger tip 360 is retracted from the velocity check valve 312 so that the check valve is free to close when the pilot valve again operates to exhaust the safety valve actuator cylinder. During the static flow conditions which are established when the pilot valve is reset the velocity check valve 312 will remain off seat due to gravity.

If desired the pilot valve P2 may be reset manually at the valve using the reset handle 194. The reset handle is engaged with the pilot valve by inserting the reset lug 200 through the pilot valve reset slot 381 into the reset groove 330a of the override sleeve 330. The pivot pin 195 of the handle is positioned in the pivot pin hole of the pilot valve body 315. The handle is then rotated clockwise as viewed from above FIG. 15A forcing the override sleeve 330 toward the override piston 324 which is shifted toward the valve assembly 323 moving the valve assembly to the reset end position thereby repeating the procedure described in connection with the hydraulic reset steps. When the safety valve S2 is fully opened the manual reset handle is removed allowing the line pressure in the pilot valve body to return the valve assembly 323, the reset piston 324, and the opening plunger 325 to the normal operating positions compressing the opening spring 331.

The pilot valve P2 operates in response to electrical failure when the electromagnet 70 is deenergized so that the pole piece 255 is released from the magnetic attraction against the mounting plate 263 of the electromagnet. The spring 262 expands pushing the pole piece toward the trigger plunger 401. The plunger 401 moves against the spring 402 and when the plunger cam surface 411 passes the locking balls 395 the locking shoulder 405 in the housing 320 cams the locking balls inwardly around the reduced end portion 410 of the plunger 401 releasing the trigger assembly for movement by expansion of the spring 403 toward the opening spring guide 382. The force of the expanding spring 403 added to the force of the compressed opening spring 331 moves the opening plunger 325 against the ball valve 354 pushing the ball valve off the seat 352 against the spring 355. The combined forces of the springs 403 and 331 move the spring guide 382 against the shoulder surface 391 fully opening the valve assembly 323 allowing the pilot valve to bleed down the safety valve actuator cylinder through the side port 321 of the pilot valve. As soon as the pressure reduction develops in the pilot valve initiating the closing of the safety valve the velocity check valve 312 goes on seat preventing a bleed down of the pressure within the body of the safety valve while the pilot valve is effecting the shutting of the safety valve. The length of the pins 385 through the spring guide 382 and the relative positions of the spring guide 382 when against the shoulder 391 and the override sleeve prevents any force being applied from the end of the spring guides 393 through the pins 385 to the override sleeve when the electrical emergency shut down trigger assembly fires to operate the pilot valve in response to electrical failure. After operating the pilot valve in response to an electrical failure the trigger assembly 332 must be manually reset and thereafter the pilot valve assembly 323 is either hydraulically or manually reset in accordance with the previously described procedures.

Manual reset of the trigger assembly of the electrical emergency shut down system of the pilot valve is done with the reset handle 194 which is inserted as previously described with the handle being rotated counter clockwise to force the override sleeve 330 toward the electromagnet 70. The override sleeve pushes the pins 385 through the spring guide 382 until the ends of the pins engage the flange 393a on the trigger spring guide 393 compressing the spring 403 and moving the locking ball retainer 394 along with the locking balls toward the electromagnet. At the time the trigger assembly is recocked the electrical signal must be reapplied to the electromagnet to again energize the magnet for attracting the pole piece 255 against the magnet compressing the spring 262. Since the spring 262 is stronger than the spring 401 the trigger assembly cannot be recocked until the pole piece is pulled against the electromagnet. As the recocking procedure of the trigger assembly occurs the movement of the plunger 401 resulting from turning the reset handle and compressing the spring 403 shifts the plunger 401 toward the electromagnet and as the locking balls 395 pass the housing locking surface 405 the plunger cam surface 411 on the plunger 401 cams the locking balls outwardly into contact with the locking surface 405. The cylindrical wall surface of the central portion of the plunger 401 then holds the balls outwardly locking the trigger assembly at the cocked position. At this stage in the resetting of the pilot valve the valve assembly 323 still remains to be reset either manually or hydraulically. The pilot valve is then restored to service by following either of the previously described hydraulic or manual procedures for shifting the pilot valve assembly 323 to reclose the valve 354 and return of the pilot valve to the fully operational condition represented in FIGS. 15A and 15B.

It will now be seen that a new and improved form of pilot valve for emergency closure of a safety valve in a fluid flow system has been described and illustrated. It will be understood that the pilot valve is operable in response to either a pressure reduction below a predetermined level in the safety valve body, or failure of an electrical signal to an electromagnet included in the pilot valve. The pilot valve may be reset to restore the valve to operation and reopen the safety valve hydraulically either at the valve or from a remote location or manually at the valve by use of a reset handle. If the pilot valve operates due to an electrical signal failure the trigger assembly of the electrical emergency shut down system is reset manually at the pilot valve and thereafter the pilot valve is restored to operation either hydraulically or manually. One form of the pilot valve includes a velocity check valve for isolating the pressure within the safety valve body from the pilot valve when the pilot valve operates to discharge the safety valve actuator cylinder. Another form of the pilot valve is used with a safety valve which is equipped with such a velocity check valve and thus the pilot valve is not fitted with a velocity check valve.

The term "hydraulic" has been used herein in connection with the reset apparatus and operational steps of the pilot valve. As used in both the specification and claims, "hydraulic" is intended to cover fluids including both liquids and gases, and thus the reset structure of the pilot valve may be operated with air, nitrogen, oil, and other suitable liquids or gases.

What is claimed is:

1. A pilot valve for opening and closing a hydraulic cylinder actuated safety valve in a fluid flow system responsive to either of a pressure reduction in said flow system and a failure of an electrical signal applied to said pilot valve comprising: a pilot valve body having a flow passage therein: means in said body providing a first port into said flow passage for communication with said actuator cylinder of said safety valve; means in said body providing a second port communicating with said flow passage for exhaust from said body; a valve assembly including a valve member in said flow passage for controlling flow from said first port to said second port; means in said body operable with said valve assembly for opening said valve assembly responsive to a predetermined low pressure in said flow passage between said first port and said valve member; means in said body operable with said valve assembly for opening said valve member responsive to an electrical signal failure to said pilot valve; and means for closing said valve assembly for resetting said pilot valve to return said pilot valve to service after operation of said pilot valve to close said safety valve.

2. A pilot valve in accordance with claim 1 wherein said means for resetting said pilot valve comprises apparatus responsive to hydraulic pressure applied to said pilot valve.

3. A pilot valve in accordance with claim 2 wherein said means for resetting said pilot valve includes manually operable mechanical means.

4. A pilot valve in accordance with claim 1 wherein said means operable responsive to an electrical signal failure comprises an electromagnet and a magnetically responsive trigger assembly for opening said valve member.

5. A pilot valve in accordance with claim 4 wherein said means for resetting said pilot valve is responsive to hydraulic pressure.

6. A pilot valve in accordance with claim 5 including manual mechanical reset means for resetting said pilot valve.

7. A pilot valve in accordance with claim 1 including means providing a second flow passage in said body communicating with said first port; and a velocity check valve in said second flow passage adapted to close when said pilot valve operates and to be reopened when resetting said pilot valve to return said pilot valve to service.

8. A pilot valve in accordance with claim 7 wherein said means for resetting said pilot valve is responsive to hydraulic pressure.

9. A pilot valve in accordance with claim 8 including manually operable mechanical reset means.

10. A pilot valve for controlling a hydraulic cylinder actuated safety valve in a fluid flow system responsive to either of a low fluid pressure in said system and failure of an electrical signal applied to said pilot valve comprising: means providing a flow passage for communicating with the fluid pressure in said flow system and with said hydraulic cylinder of said safety valve; means providing an exhaust port connected with said flow passage; valve means in said flow passage for controlling flow from said flow passage into said exhaust port; means for opening said valve means responsive to a predetermined low pressure in said fluid flow system; means for opening said valve means responsive to failure of said electrical signal applied to said pilot valve; and means for closing said valve means to reset said pilot valve after operation of said valve to reclose said safety valve.

11. A pilot valve in accordance with claim 10 wherein said means for opening said valve means is hydraulic pressure operated apparatus.

12. A pilot valve in accordance with claim 11 including manually operable mechanical means for closing said valve means.

13. A pilot valve in accordance with claim 10 including velocity check valve means for shutting off flow from said fluid flow system into said flow passage of said pilot valve.

14. A pilot valve in accordance with claim 13 wherein said means for closing said valve means to reset said pilot comprises hydraulically operable structure.

15. A pilot valve in accordance with claim 14 including manually operable mechanical means for closing said valve means to reset said pilot valve.

16. A pilot valve for controlling the opening and closing of a safety valve in a fluid flow system responsive to either of a predetermined low pressure level in said fluid flow system and failure of an electrical signal applied to said pilot valve comprising: a pilot valve body having a longitudinal bore extending therethrough; means providing a flow passage in said body adapted to communicate with the fluid pressure in said flow system controlled by said safety valve and with an actuator cylinder on said safety valve adapted to hold said safety valve open responsive to the pressure in said fluid flow system applied to said cylinder through said pilot valve and to close said safety valve responsive to release of said flow system pressure from said cylinder through said pilot valve; means providing an exhaust port in said pilot valve body communicating with said flow passage in said body for exhausting fluid from said actuator cylinder of said safety valve; a pilot valve assembly movably secured in said flow passage of said pilot valve body for controlling flow from said flow passage to said exhaust port, said valve assembly having a valve member including a surface portion exposed to the pressure in said fluid flow system through said first flow passage for holding said valve assembly closed to isolate said exhaust port when said flow system pressure is applied through said pilot valve to said actuator cylinder holding said safety valve open; a pilot valve assembly opening member engageable with said valve member of said pilot valve assembly for moving said valve member to an open position to communicate said flow passage with said exhaust port; means coupled with said opening member biasing said opening member toward said valve member and adapted to open said valve member when said flow system pressure in said flow passage on said valve member decreases below a predetermined value; an electromagnet connected with said pilot valve body; a trigger assembly in said pilot valve body for coupling said electromagnet with said opening member, said trigger assembly being restrained in a cocked condition by said electromagnet when an electrical signal is applied to said electromagnet and being releasable when said electromagnet is deenergized to apply a force to said opening member sufficient in combination with said force applied by said means biasing said opening member toward said valve member of said pilot valve assembly to open said valve member; means in said pilot valve body including a side port for fluid reset pressure and fluid pressure responsive means for applying a reset force to said pilot valve assembly for closing said valve member by moving said valve assembly away from said opening member; and a manually operable reset member coupled with said hydraulic reset means and with said trigger assembly for manually resetting said pilot valve by closing said pilot valve assembly and recocking said trigger assembly.

17. A pilot valve in accordance with claim 16 including a velocity check valve assembly secured in said pilot valve body in said first flow passage for shutting off flow responsive to a predetermined velocity from said flow system into said pilot valve and means connected with said pilot valve assembly for holding said velocity check valve open during reset of said pilot valve.

18. A pilot valve in accordance with claim 16 wherein said hydraulic reset means includes structure defining a pressure chamber in said pilot valve body; and a piston in said chamber around said opening member for applying said force to said pilot valve assembly.

19. A pilot valve in accordance with claim 18 including a velocity check valve assembly in said first flow passage responsive to a predetermined fluid velocity from said fluid flow system for isolating said pilot valve from said fluid flow system in response to operation of said pilot valve.

20. A pilot valve in accordance with claim 18 wherein said manual reset means comprises a sleeve member slidably positioned on said opening member engageable at one end with said hydraulic reset piston and engageable along the opposite end with said means biasing said opening member toward said pilot valve assembly and engageable with said trigger assembly for recocking said trigger assembly, said sleeve having recess means for engagement by a manual reset handle.

21. A pilot valve in accordance with claim 20 including a velocity check valve assembly in said flow passage for isolating said pilot valve from said fluid flow system on operation of said pilot valve and means connected with said pilot valve assembly for holding said velocity check valve open during reset of said pilot valve.

22. A pilot valve in accordance with claim 20 wherein said means biasing said opening member toward said valve assembly comprises a spring and means for adjusting the compression of said spring to vary the operating pressure of said pilot valve and said trigger assembly includes a spring biased guide adapted to apply a force to said opening member, a locking ball assembly for holding said guide in a cocked position, and means including a pole piece adapted to be attracted by said electromagnet for holding said trigger assembly cocked and for releasing said locking ball assembly to release said trigger assembly when said electromagnet is deenergized.

23. A pilot valve in accordance with claim 22 including a velocity check valve assembly in said flow passage for isolating said pilot valve from said fluid flow system upon operation of said pilot valve and means connected with said pilot valve assembly for holding said velocity check valve open during reset of said pilot valve.

24. A pilot valve for operation with a fluid flow system safety valve to communicate the body of said safety valve with an actuator cylinder on said safety valve for holding said safety valve open responsive to fluid system pressure in said body of said safety valve and for exhausting fluid pressure in said actuator cylinder to permit said actuator cylinder to close said safety valve responsive to either of a predetermined low pressure in said body of said safety valve and failure of an electrical signal applied to said pilot valve comprising: a pilot valve body having a longitudinal bore therethrough; means along said bore within said pilot valve body defining a flow passage for communicating said pilot valve with said body of said safety valve; means defining an exhaust port in said pilot valve body communicating with said flow passage to exhaust pressure in said actuator cylinder through said pilot valve for closing said safety valve; means defining a side port communicating with said flow passage for flow between said pilot valve and said actuator cylinder of said safety valve; a longitudinally movable pilot valve assembly in said bore of said body of said pilot valve for controlling flow in said flow passage between said exhaust port and said port leading to said safety valve actuator cylinder, said pilot valve assembly having a valve seat, a ball valve engageable with said valve seat for shutting off flow through said valve assembly, and a spring engaging said ball valve biasing said ball valve against said valve seat, said entire pilot valve assembly being movable from a first end position at which said valve assembly functions to close for isolating said exhaust port and to open for communicating said exhaust port with said flow passage and a second end position for reset of said pilot valve at which said ball valve recloses after opening to exhaust pressure from said safety valve actuator cylinder; an opening plunger slidably positioned in said pilot valve body having a first end engageable with said pilot valve assembly ball valve to move said ball valve off seat against opposing pressure on said ball valve from said fluid system in said flow passage; an opening spring in said pilot valve body for applying a force to said opening plunger to open said ball valve of said pilot valve assembly; an opening spring guide between one end of said opening spring and the second opposite end of said opening plunger; an opening spring adjusting nut engaged in said pilot valve body against the second opposite end of said opening spring to vary the compression of said opening spring for adjusting the opening pressure of said pilot valve; an electromagnet secured with said pilot valve body; a trigger assembly for magnetically coupling said electromagnet with said opening plunger through said opening spring guide including a trigger assembly spring, a trigger assembly spring guide having an end surface engageable with said opening spring guide, a trigger spring retainer engaged with the other end of said trigger spring, a locking ball retainer secured with said opening spring guide, radially movable locking balls disposed in circumferentially spaced holes in said locking ball retainer for movement between inward release positions and outward locking positions, means providing an internal annular sloping locking and cam surface in said pilot valve body around said locking ball for releasably locking said trigger assembly in a cocked condition when said balls are held outwardly against said valve body locking surface, a ball operating plunger in said locking ball retainer having a sloping expander surface and a cylinder locking surface, a spring between said locking ball plunger and said locking ball retainer for biasing said locking ball plunger toward said locking balls to expand said locking balls for holding said trigger assembly in a cocked condition and permitting said locking balls to move inwardly to release positions when said locking ball plunger is moved against said spring biasing said plunger toward said locking balls, a magnetic pole piece between said locking ball plunger and said electromagnet, and a spring around said pole piece biasing said pole piece away from said electromagnet toward said locking ball plunger for moving said plunger to release said trigger assembly when said pole piece is released from said electromagnet upon failure of an electrical signal to said electromagnet; means providing a fluid pressure reset port in said pilot valve body; means providing a fluid pressure reset chamber in said pilot valve body around said opening plunger; a reset piston in said reset chamber adapted to receive fluid pressure on one side from said reset fluid pressure port and adapted on the other side to engage said pilot valve assembly for moving said pilot valve assembly from said first end position to said second reset end position; a manual override sleeve on said opening plunger in said pilot valve body engageable at one end with said reset piston, said override sleeve having a reset slot for engagement with a manual reset handle; means providing access openings through said pilot valve body to said override sleeve for connecting a manual reset handle through said pilot valve body with said override sleeve to move said sleeve in said body in opposite directions toward said pilot valve assembly and toward said trigger assembly; and slidable means between said trigger assembly and the opposite second end of said manual override sleeve for engaging said trigger assembly spring guide to recock said trigger assembly responsive to movement of said override sleeve toward said trigger assembly.

25. A pilot valve in accordance with claim 24 including a velocity check valve assembly connected with said pilot valve body and provided with a flow passage for communicating said pilot valve body with said body of said safety valve to shut off flow from said body of said safety valve to said pilot valve responsive to a predetermined velocity of flow from said safety valve body into said pilot valve, said velocity check valve being disposed on the opposite side of said port to said actuator cylinder of said safety valve from said pilot valve assembly; and means on said pilot valve assembly for engaging and holding said velocity check valve open when said pilot valve assembly is moved to said second reset position for recharging said actuator cylinder of said safety valve from said fluid flow system pressure within said body of said safety valve.

* * * * *